United States Patent
Thanvantri Vasudevan et al.

(10) Patent No.: US 12,541,558 B1
(45) Date of Patent: Feb. 3, 2026

(54) GENERATION OF BENCHMARKING DATASETS FOR CONTEXTUAL EXTRACTION

(71) Applicant: DocuSign, Inc., San Francisco, CA (US)

(72) Inventors: Vishal Thanvantri Vasudevan, Lynnwood, WA (US); Mohammadhossein Basi, Irvine, CA (US); Ramachandra Kota, Mountain View, CA (US); Kristina Lee Murphy, Phoenix, AZ (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/397,680

(22) Filed: Dec. 27, 2023

(51) Int. Cl.
*G06F 16/906* (2019.01)
*G06F 16/23* (2019.01)

(52) U.S. Cl.
CPC ........ *G06F 16/906* (2019.01); *G06F 16/2365* (2019.01)

(58) Field of Classification Search
CPC .......................... G06F 16/906; G06F 16/2365
USPC ........................................................ 707/694
See application file for complete search history.

(56) References Cited

U.S. PATENT DOCUMENTS

| | | | |
|---|---|---|---|
| 2009/0012926 A1 | 1/2009 | Ishikawa et al. | |
| 2014/0195897 A1 | 7/2014 | Balinsky | |
| 2019/0325066 A1 | 10/2019 | Krishna | |
| 2020/0382677 A1* | 12/2020 | Chen | H04L 63/0428 |
| 2020/0394567 A1* | 12/2020 | Choe | G06N 5/01 |
| 2021/0375291 A1 | 12/2021 | Zeng | |
| 2022/0237373 A1 | 7/2022 | Singh Bawa | |
| 2023/0101817 A1* | 3/2023 | Sinha | G06F 16/93 707/722 |
| 2023/0368043 A1* | 11/2023 | Macklin | G06N 5/022 |
| 2024/0111397 A1* | 4/2024 | Kuang | G06F 40/197 |
| 2024/0135096 A1* | 4/2024 | Jain | G06N 3/045 |

OTHER PUBLICATIONS

Chan, et al., "BERT for Question Generation," International Conference on Natural Language Generation, 2019 (Year: 2019).
Lee, et al., "Generating Queries from User-Selected Text", ACM 2012, Year: 2012.
Park, et al., "Reducing Redundancy in Keyword Query Processing on Graph Databases", Journal of Information Science and Engineering, 2018. (Year: 2018).

\* cited by examiner

*Primary Examiner* — Cam Linh T Nguyen
(74) *Attorney, Agent, or Firm* — KDW FIRM PLLC

(57) ABSTRACT

A method, a system, and a computer program product for generating a benchmarking dataset. A type of an electronic document is determined. Using the type of the electronic document, a first request to generate one or more labels for the electronic document is generated. Using a content of the electronic document, a second request to generate one or more labels for the electronic document is generated. The electronic document and the first and second requests are sent to a generative artificial intelligence (AI) model. The generative AI model generates one or more first labels for the electronic document based on the first request and one or more second labels for the electronic document based on the second request. Using one or more first and second labels, one or more labels for the electronic document are generated.

15 Claims, 18 Drawing Sheets

GENERATION OF BENCHMARKING DATASETS FOR CONTEXTUAL EXTRACTION

BACKGROUND

Document management platforms are typically tasked with managing a growing collection of electronic documents. This may involve making the documents readable (e.g., through optical character recognition), parsing the documents and determining subject matter and/or content of documents. Electronic documents can include, for example, legal agreements, publicly available documents, such as, documents filed with governmental agencies, and/or any other documents. Analysis of documents or portions thereof is a difficult and compute-intensive operation, especially when large documents are involved. Large language models are used to process such documents to generate summaries of documents, summaries of certain portions of documents, etc. However, some existing large language models are ineffective in properly analyzing the documents, and existing document management platforms do not have mechanism to assess effectiveness of such models, which can lead to results that are inaccurate or worse, incorrect.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
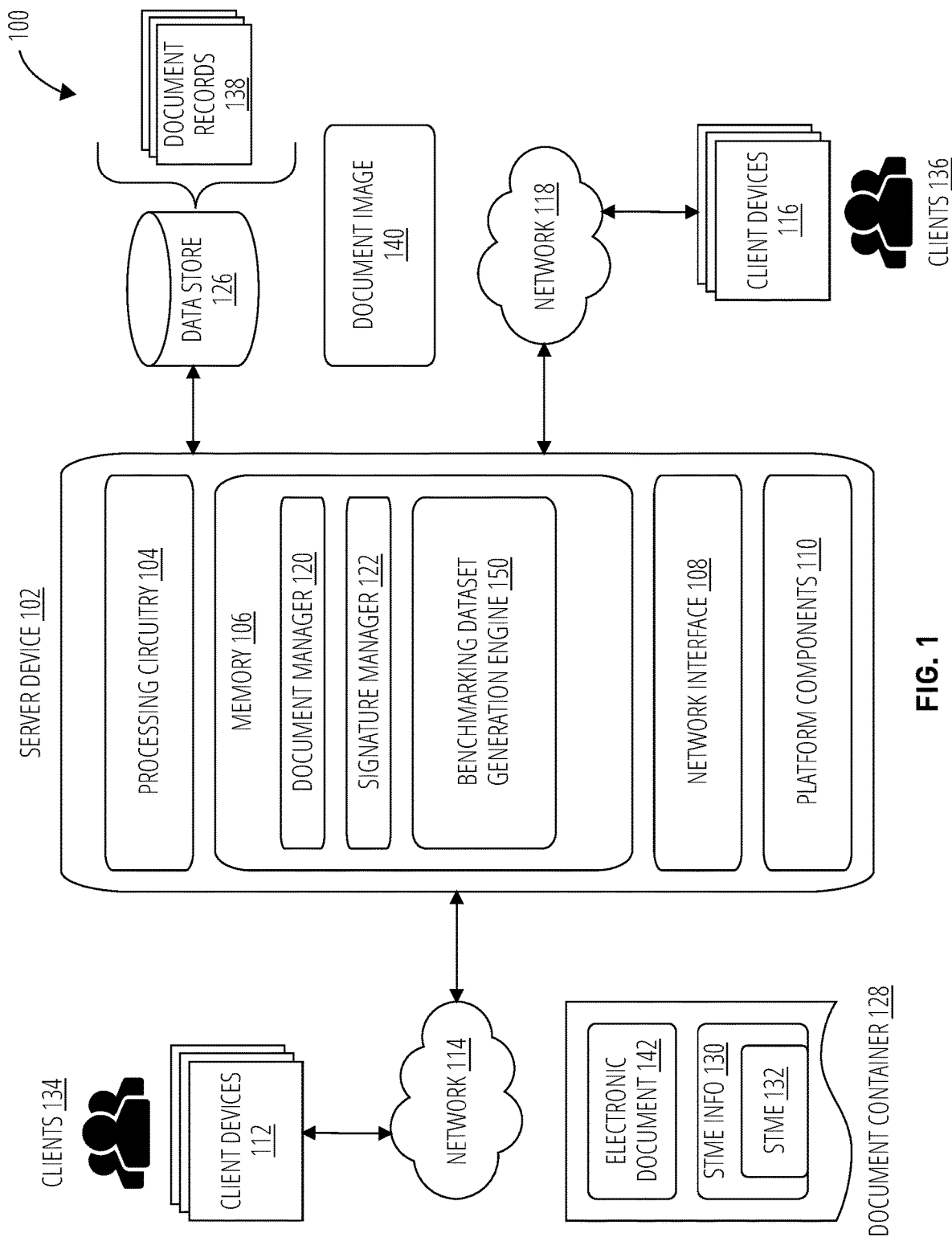
FIG. 1 illustrates a system in accordance with one embodiment.

Embodiments disclosed herein are generally directed to techniques for processing of documents and/or various summaries of such documents using a graphical user interface, where such document processing is assisted through use of machine learning models and artificial intelligence architectures. In some example embodiments, the current subject matter relates to an ability to generate one or more datasets, through use of various document labeling techniques, which may be used for evaluation of large language models.

In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter may be configured to provide an ability to generate a dataset (e.g., a benchmarking dataset) that may be used to analyze and/or assess effectiveness of a large language model. In some example embodiments, the generated dataset may be used to train such large language model. For instance, the dataset may be used to train the model so that it may be used to respond to specific queries (e.g., document summarization, extraction of specific clauses of an agreement and summarizing them, identifying contractual obligations, etc.).

Generation of a dataset may be based on labeled and/or unlabeled electronic documents (e.g., documents stored in electronic format, e.g., .docx, .pdf, html, etc.) that may be obtained from one or more storage locations. Labeled documents may be documents that may have been previously analyzed (either manually and/or using a machine learning model) and labeled. For example, to label a lease agreement, the agreement may be parsed into specific clauses, paragraphs, sentences, words, etc. and/or any other portions (such as, for example, through use of optical character recognition, etc.). Upon analysis of these portions (such as, for example, through natural language processing, and/or any other mechanisms), various labels, identifiers, metadata, and/or any other identification may be assigned to the portions indicating content of each specific portion (e.g., "termination label" may be assigned to a termination clause of the lease agreement, etc.). Alternatively, or in addition, the labels may identify the entire document, any summary/ies of the document and/or any of its portions. The labels may be stored together with the documents in a storage location. The labels may be stored in any desired fashion.

Unlabeled document may be documents that may be stored in any public and/or private storage locations, databases, etc. For example, the documents may be stored in one or more government databases (e.g., SEC-EDGAR, etc.), non-governmental databases, third party publicly accessible databases, member-access based databases, etc. The unlabeled documents may or may not have been parsed, analyzed, etc. The documents in such storage locations may or may not include identification information that may identify the document and/or any portions thereof.

One or more of such labeled and/or unlabeled electronic documents may be provided to a generative artificial intelligence (AI) model for processing. The generative AI model(s) may be part of the current subject matter system and/or be one or more third party models (e.g., ChatGPT, Bard, DALL-E, Midjourney, DeepMind, etc.). The generative AI model(s) may be configured to generate one or more labels based on the provided electronic documents.

In some embodiments, the labeled and/or unlabeled electronic documents may be analyzed to determine whether the documents are of a specific type. For example, a type of an electronic document may include a legal document (e.g., a lease agreement, a non-disclosure agreement, a sales agreement, a government contract, a document produced during a legal action, etc.), a non-legal document (e.g., a news article, a book, a journal publication, etc.). Once the type of the electronic document is determined, the current subject matter may be configured to use to the type of the document to generate a request or a query to be sent to one or more generative AI models, where the request may cause the generative AI model to generate one or more labels for the electronic document. For example, the request may ask the generative AI model to generate labels for legal document and, namely, a lease agreement. The generated labels may be irrespective of the content of the lease agreement but may be generic labels that may typically be associated with any lease agreement. Another request for labels to the generative AI model may be generated based on analysis of the content the electronic document. For example, the request may include information about the parties to the lease agreement, the property identified in the lease agreement, specific conditions of the lease agreement, etc. The generative AI model may take this information and generate a tailored set of labels that may be specific to the content of the electronic document (i.e., lease agreement in this case).

The requests may be sent to the generative AI model, which, in turn, may generate two sets of labels corresponding to the two requests, i.e., in the example above, one set of labels may be generated for a generic lease agreement, and another set of labels may be generated based on the content of the lease agreement. The first set of labels may be generated using at least one of the following: an entirety of the electronic document, one or more pages of the electronic document (e.g., page identifying the parties, page identifying specific clauses (e.g., termination, jurisdiction, etc.)), one or more sentences of the electronic document (e.g., sentence specifying jurisdiction), one or more phrases of the electronic document (e.g., phrases discussing payment provisions), one or more words of the electronic document, one or more portions of the electronic document, and any combinations thereof. The first and second sets of labels may be combined to form a combined set of labels. The combined labels may eventually be used to form a benchmarking dataset for evaluating how effective one or more large language models and/or any other types of machine learning models are at analyzing content of electronic documents and/or at performing contextual extractions from electronic documents.

The labels may also be validated through subject matter analysis, e.g., whether the label (e.g., sentence, word, phrase, etc.) is related to the content of the electronic document. Labels may be discarded if they do not correspond to the document's content (e.g., a label indicating a termination provision of a lease agreement is provided, whereas the document is a sales agreement, which is non-responsive). If the labels correspond to the subject matter of the query (e.g., a label indicating termination period of the lease agreement corresponds to a lease agreement having termination provisions of the agreement indicating that the "term is one year") may be considered as validated labels and stored as such.

In some embodiments, to analyze labels, one or more rules or guidelines may be generated. The rules may rely on various methodologies for analyzing relevance of labels. For example, a precision-and-recall methodology, a normalized discounted cumulative gain (NDCG) methodology, and/or any other methodology may be used. The validated labels may form a benchmarking dataset, which, in turn, may be used to assess or evaluate effectiveness of machine learning models, such as, for example, large language models, generative AI models, etc., at contextual extraction from electronic documents.

In some embodiments, for evaluation of large language models, a ground truth machine learning model may be identified and trained using the benchmarking dataset and/or any other dataset. The model may be selected from a plurality of machine learning models and trained using the dataset so that one or more ground truth keys representative of the electronic document may be generated. Each ground truth key may be associated with a ground truth value corresponding to a portion of the electronic document.

Once the ground truth machine learning model and ground truth key-value pairs are identified/generated, another machine learning model (e.g., a large language model, a generative AI model, etc.) may be selected and requested to generate one or more keys for the electronic document, where each key may be associated with a value. The generated key-value pairs may be compared to the ground truth key-value pairs. The comparison may be used to determine whether the selected machine learning model is acceptable for generating labels for electronic documents.

One of the technical benefits of the current subject matter is that it provides for a dynamic generation of benchmarking datasets that may be used to analyze and/or train large language models for effectively and efficiently processing of large electronic documents that may be retrieved from data sources that are not well-organized or at all. The processes disclosed herein generate more accurate document labels that may be validated and/or reviewed in accordance with specific rules. Use of such accurate/validated sets of labels allows for generation of a more refined training dataset ensuring that analysis and/or training of large language models using it will be more precise, thereby enabling more accurate outcomes when such trained large language models are used to process large electronic documents. Further, use of the labels generated in accordance with the processes disclosed herein to assess large language models substantially reduces use of compute resources that may typically be consumed by generative AI models in performing of complete document analysis. Some conventional systems typically analyze an entire document to generate labels, which may often result in incomplete or even inaccurate labels (with omissions, errors, etc.), which cannot be used for analysis or training of large language models. Additionally, use of generative AI models to generate labels consumes a substantial amount of computing resources and takes a long time to complete, especially for large documents.

An additional technical benefit to the current subject matter is its ability to generate training datasets, not only expeditiously, but more accurately. The training datasets may be used for generation of ground truth key-value pairs representing document's contextual extractions against which key-value pairs generated by generative AI models may be compared to determine effectiveness of the generative AI models. This ensures that there are substantially fewer errors that may occur during generation as well as eventual analysis and validation of label sets, as a specific dataset has been accurately prepared. Existing systems lack an ability to refine the label-generation processes to such a higher degree and instead analyze and summarize full documents, which enhances possibilities of errors and mistakes.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 17:
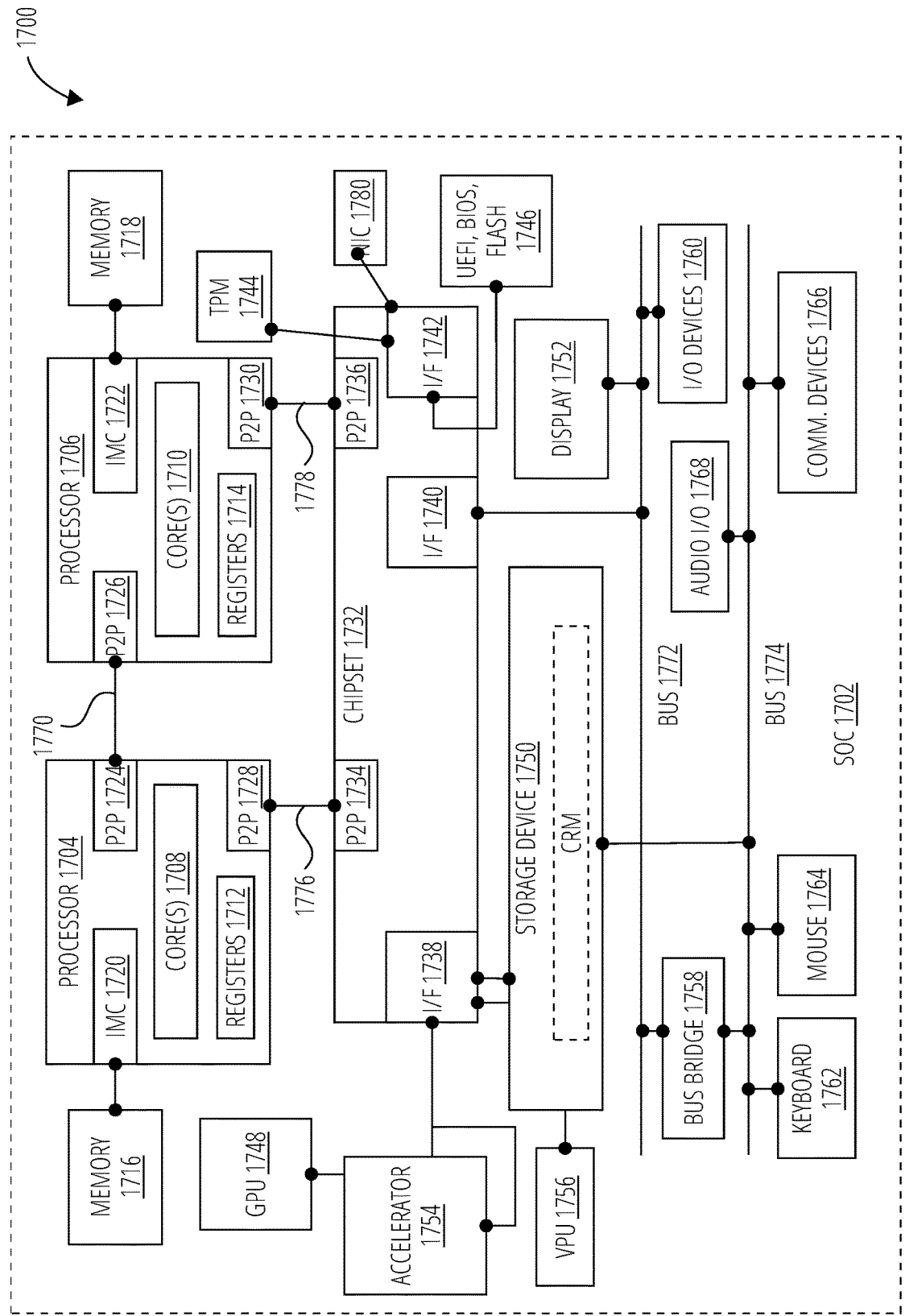
FIG. 17 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1700 as depicted in FIG. 17.

Figure 18:
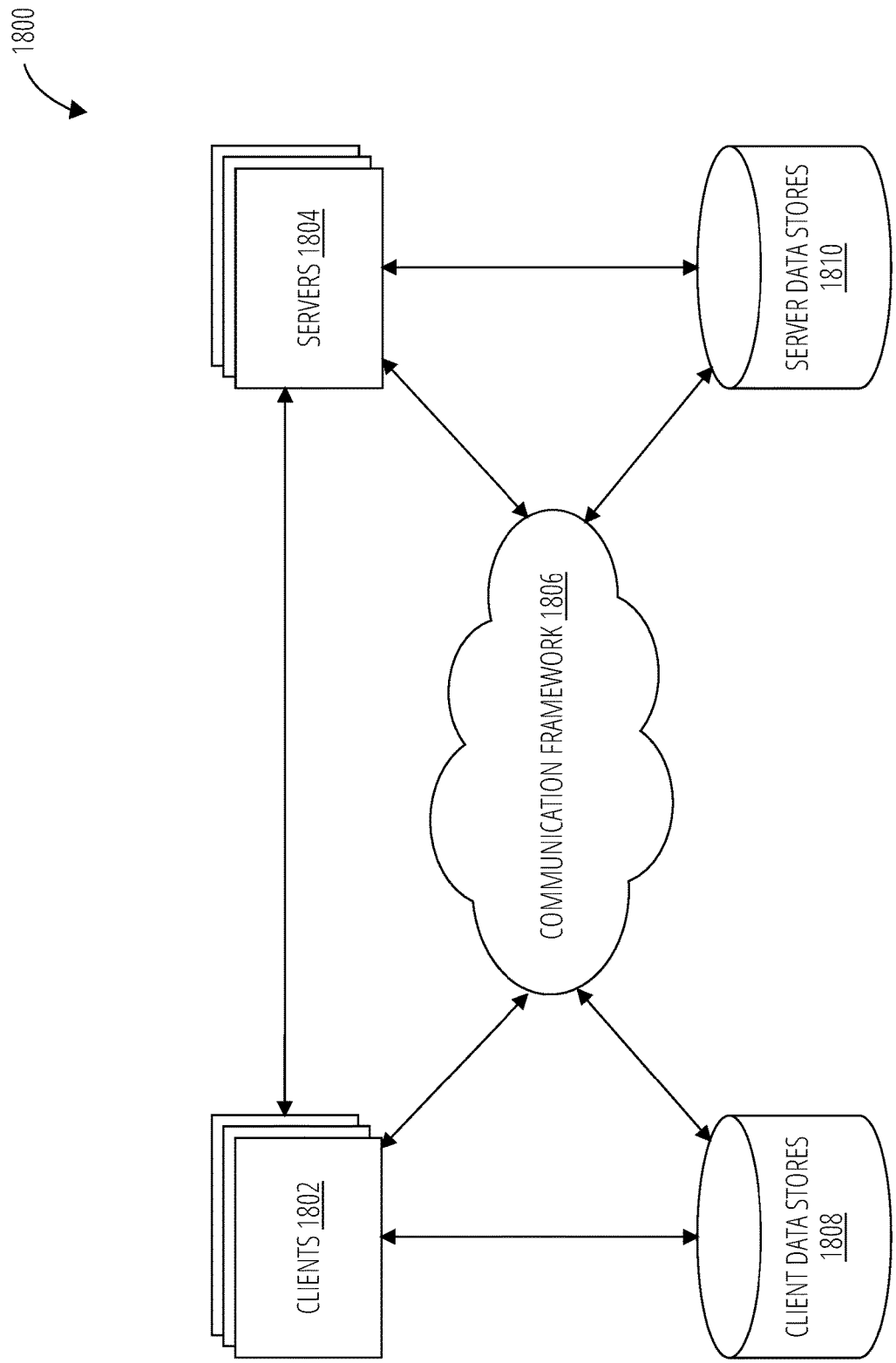
FIG. 18 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 1800 as depicted in FIG. 18.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a benchmarking dataset generation engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 5:
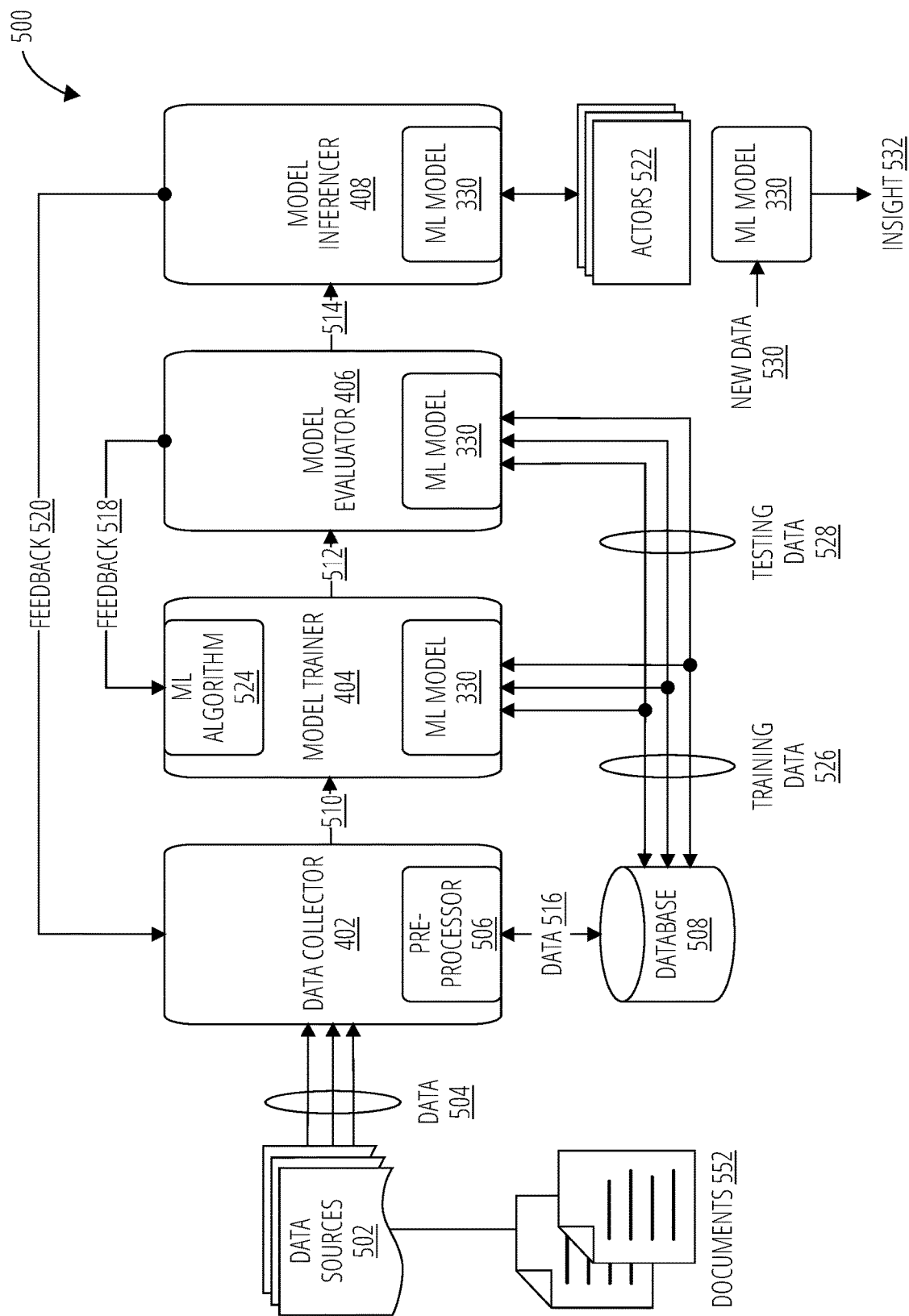
FIG. 5 illustrates an artificial intelligence architecture that may be used by the training device to generate the ML model for deployment by the inferencing device.

The benchmarking dataset generation engine 150 may implement and/or manage various artificial intelligence (AI) and machine learning (ML) agents to assist in various operational tasks for the EDMP of the system 100. The AI/ML agents and their operation associated with the benchmarking dataset generation engine 150, and associated software elements, are described in more detail with reference to an artificial intelligence architecture 500 as depicted in FIG. 5. The benchmarking dataset generation engine 150, and associated hardware elements, are described in more detail with reference to a computing architecture 1700 as depicted in FIG. 17.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 7:
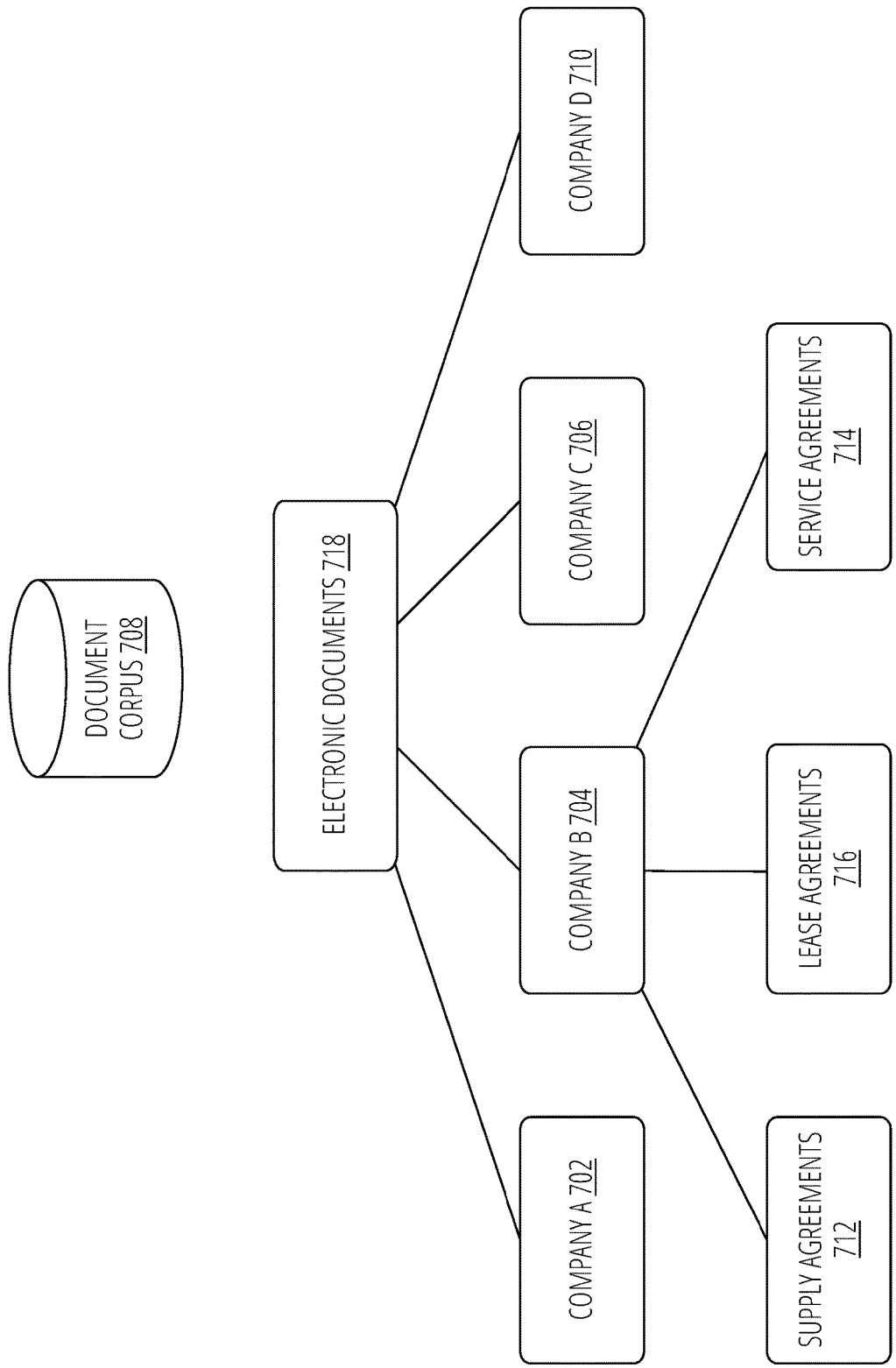
FIG. 7 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 718, as shown in FIG. 7, with tools, applications, and workflows developed by DocuSign. For example, the electronic documents 718 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, as discussed above, the system 100 may include a benchmarking dataset generation engine 150. The benchmarking dataset generation engine 150 may implement a set of tools and/or algorithms to generate one or more labels for electronic documents and/or any parts thereof that may be used to train and/or evaluate one or more large language models. The benchmarking dataset generation engine 150 may be configured to retrieve one or more first electronic documents from a plurality of electronic data sources. For example, as stated above, the data sources may include various databases, e.g., government databases, public databases, etc., where electronic documents may be stored without specific identifiers and/or other ways of particularly determining how each portion of an electronic document may be identified (e.g., whether a particular clause in a sales agreement relates to termination, governing law, etc.). Document retrieval may be accomplished in response to a query and/or in any desired way.

Using the retrieved documents, the benchmarking dataset generation engine 150 may then be configured to generate one or more requests and/or queries to a generative AI model for generation of one or more labels for electronic documents. To generate requests for labels, the engine 150 may analyze a document to determine document's specific type (e.g., a legal document (e.g., a lease agreement, a non-disclosure agreement, a sales agreement, a government contract, a document produced during a legal action, etc.), a non-legal document (e.g., a news article, a book, a journal publication, etc.), and/or any other type). Using the type of the document, the engine 150 may generate or form a request to generative AI model(s) for generating one or more first labels for the electronic document. The first labels may be generated irrespective of the content of the document and may, for example, be generic labels that may typically be associated with a particular type of document. The benchmarking dataset generation engine 150 may form and/or generate another request for labels to the generative AI model to generate a second set of labels. The request may be generated based on analysis of the content the electronic document. The engine 150 may then provide this request to the generative AI model and ask it to generate a tailored set of labels that may be specific to the content of the electronic document.

As stated above, the requests may be sent to the generative AI model, which, in turn, may generate two sets of labels corresponding to the two requests. The first set of labels may be generated using at least one of the following: an entirety of the electronic document, one or more pages of the electronic document (e.g., page identifying the parties, page identifying specific clauses (e.g., termination, jurisdiction, etc.)), one or more sentences of the electronic document (e.g., sentence specifying jurisdiction), one or more phrases of the electronic document (e.g., phrases discussing payment provisions), one or more words of the electronic document, one or more portions of the electronic document, and any combinations thereof. The engine 150 may receive both sets of labels from the generative AI model and combine them to create a combined set of labels. The combined labels may be used to form a benchmarking dataset for evaluating effectiveness of language model(s) and/or any other types of machine learning (ML) models when executing contextual extractions from electronic documents.

Along with generating of the validated labels, the benchmarking dataset generation engine 150 may be configured to generate one or more rules for analysis of the validated labels. The rules may be related to specific types of electronic document (e.g., sales agreements, lease agreements, etc.), specific subject matter identified in the documents (e.g., termination provisions in sales agreements, etc.), specific large language models (LLM) that may be used for analyzing particular type of documents (e.g., an LLM that may be used to analyze lease agreements), and/or any other type of rules. An example of a rule may include: "a termination label is to be assigned to termination and term provisions of an agreement after analysis of the agreement, and if other than termination label is assigned to termination and term provision of the agreement, then the label is incorrect and needs to be discarded, otherwise the label is acceptable."

The benchmarking dataset generation engine 150 may be configured to use the generated rules to analyze the validated labels. If the benchmarking dataset generation engine 150 determines that at least one validated label complies with the generated rules, the engine 150 may accept the validated label for the electronic documents, and hence be included in the benchmarking dataset that may then be used for training and/or evaluation of a large language model. Otherwise, if the benchmarking dataset generation engine 150 determines that at least one validated label failed to comply with the generated rules, it may prevent use of such validated label for labeling the electronic documents, and hence exclude it from the benchmarking dataset.

Figure 2:
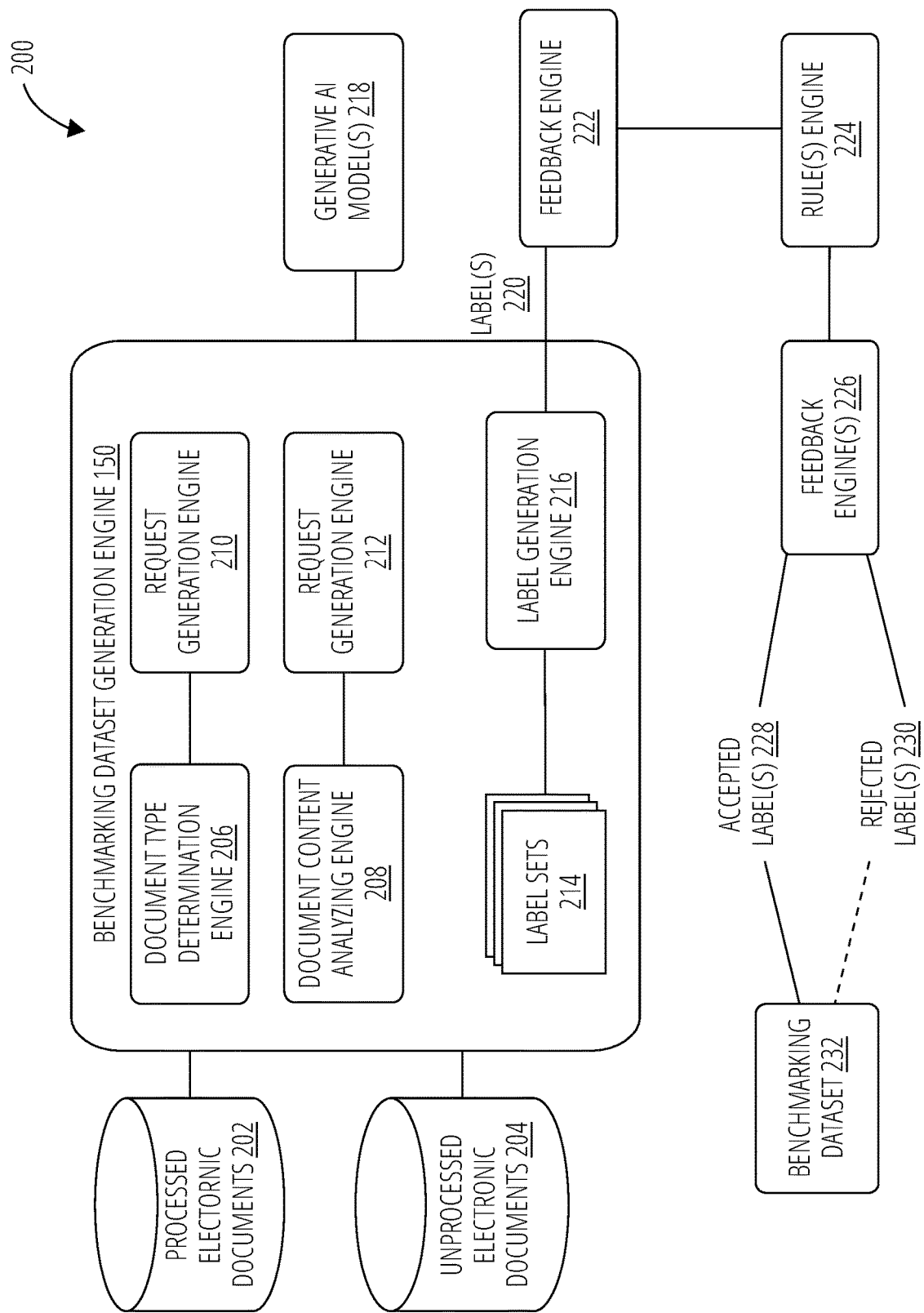
FIG. 2 illustrates example benchmark processing system that may include a benchmarking dataset generation engine, according to some embodiments of the current subject matter.

FIG. 2 illustrates example benchmark processing system 200 that may include the benchmarking dataset generation engine 150, according to some embodiments of the current subject matter. The benchmarking dataset generation engine 150 may be communicatively coupled to one or more electronic document storage sources 202 and 204 and may include a document type determination engine 206, a document content analyzing engine 208, request generation engines 210, 212, and a label generation engine 216. The benchmarking dataset generation engine 150 may also be communicatively coupled to a generative AI model(s) 218 for generation of one or more labels for electronic documents, as discussed herein.

The benchmarking dataset generation engine 150 may also be configured to be communicatively coupled to a feedback engine 222, which in turn, may be communicatively coupled to a rule(s) engine 224 and/or one or more feedback engine(s) 226. The system 200 may be configured to generate one or more benchmarking datasets that may include one or more accepted label(s) 228 that may result from one or more processes executed by one or more components of the system 200. The system 200 may also generate one or more labels that are not accepted (e.g., rejected label(s) 230), which do not become part of the benchmarking dataset.

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from document storage sources 202 and/or 204). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150, the document storage sources 202 and/or 204, the generative AI model 218, and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

As shown in FIG. 2, the benchmarking dataset generation engine 150 may be configured to execute a query to retrieve one or more electronic documents from one or more electronic document storage sources 202 and/or 204. Alternatively, or in addition, the electronic documents may be provided to the benchmarking dataset generation engine 150 without a query and/or any other type of request. The electronic document data sources 202, 204 may be any type of data sources, e.g., databases, servers, and/or any other storage locations.

Data storage source 202 may be configured to be one or more private databases, access to which might not be publicly available (e.g., internal company databases, specific user access databases, etc.). The electronic documents stored in these databases may be organized in a predetermined fashion, which may allow ease of access to the electronic documents and/or any portions thereof. For example, electronic documents stored in these databases may be labeled, searchable, and/or otherwise, easily identifiable. The documents may be stored in a particular electronic format (e.g., PDF, .docx, etc.).

Data storage source 204 may be configured to be public non-government databases, government databases (e.g., SEC-EDGAR, etc.), etc. that may store various electronic documents, such as, for instance, legal documents (e.g., commercial contracts, lease agreements, public disclosures (e.g., 10 k statements, 5 k statements, quarterly reports, etc.). The electronic documents stored in these databases may be identified using various identifiers, which may allow location of these documents in the databases, however, contents of electronic documents stored therein might not be parsed and/or specifically identified. For example, a review of the entire electronic document (e.g., 10 k statement of a company stored in SEC-EDGAR database) may need to be performed to identify a particular section (e.g., a section related to compensation of executives for the company).

Upon receiving electronic documents from the sources 202 and/or 204, the document type determination engine 206 may be configured to analyze the electronic documents to determine their respective types. The types may include, for example a legal document (e.g., a lease agreement, a non-disclosure agreement, a sales agreement, a government contract, a document produced during a legal action, etc.), a non-legal document (e.g., a news article, a book, a journal publication, etc.) and/or any other type. The type may be determined by performing one or more searches of an electronic document using one or more keywords. For instance, determining that the electronic document contains words "lease agreement" (e.g., after a search for "lease agreement") may lead the document type determination engine 206 to conclude the electronic document is a legal agreement, and, specifically, a lease agreement. Alternatively, or in addition, each electronic document may include one or more identifiers, metadata, etc. That may indicate specific nature of the electronic document.

Once the type of the electronic document is determined, the document type determination engine 206 may pass this information to the request generation engine 210. The request generation engine 210 may be configured to use the type of the electronic document to generate a request or a query that may be sent to one or more generative AI models 218. The request generated by the engine 210 may indicate that the electronic document is a lease agreement and request generative AI model(s) 218 to generate labels for a generic lease agreement (e.g., "This document is a lease agreement. Please generate labels for a generic lease agreement."). The labels may be generated by the generative AI model(s) 218 irrespective of the content of the specific lease agreement that may also be sent to the generative AI model(s) 218 as part of the request by the engine 210. Hence, the generative AI model(s) 218 may be configured to generate labels that may typically be associated with any lease agreement (e.g., "termination provision", "enforcement jurisdiction", etc.).

Another request for labels to the generative AI model may be generated by based on an analysis of the content the electronic document. The document content analyzing engine 208 may be configured to analyze the content of the electronic document. For example, the engine 208 may be configured to search the document to determine whether certain keywords are present (e.g., "lease agreement", "address", "lease term", etc.). Based on the keywords, the engine 208 may determine content of the document and/or general scope of content. The document content analyzing engine 208 may pass the information it obtains from the electronic document to request generation engine 212, which may generate another request to the generative AI model(s) 218. For example, following the lease agreement example, the request generated by the engine 212 may include information about the parties to the lease agreement, the property identified in the lease agreement, specific conditions of the lease agreement, etc. The generative AI model 218 may use this information and generate a tailored set of labels that may be specific to the content of the electronic document (i.e., lease agreement in this case).

In some embodiments, the generative AI model(s) 218 may receive the electronic document along with one or both of the requests generated by engines 210, 212. For instance, if the request sent by the engine 210 includes the electronic document, the engine 212 might not forward the document to the generative AI model(s) 218. The generative AI model(s) 218 may then rely on the information contained in the requests and the electronic document to generate two label sets 214. As can be understood, the generative AI model(s) 218 may be instructed to generate any number of label sets 214. In some embodiments, at least one of the label sets, e.g., generated in response to the requests from engines 210 and/or 212, may be generated using at least one of the following: an entirety of the electronic document, one or more pages of the electronic document (e.g., page identifying the parties, page identifying specific clauses (e.g., termination, jurisdiction, etc.)), one or more sentences of the electronic document (e.g., sentence specifying jurisdiction), one or more phrases of the electronic document (e.g., phrases discussing payment provisions), one or more words of the electronic document, one or more portions of the electronic document, and any combinations thereof.

The label sets 214 may then be provided to the label generation engine 216 to generate a combined set of labels. The combined set of labels may include one or more labels from the set of labels generated by the generative AI model(s) 218 in response to request from engine 210 and/or one or more labels from the set of labels generated by the generative AI model(s) 218 in response to request from engine 212. The label generation engine 216 may determine that some labels generated by the generative AI model(s) 218 (in response to requests 210 and/or 212) from one set of labels cannot be used to label a particular document (e.g., a label designating a commercial lease agreement cannot be used to label a residential lease agreement). Thus, any such labels may be excluded from the set of label(s) 220 that the label generation engine 216 may output. Alternatively, or in addition, the label generation engine 216 may combine all labels responsive to requests 210 and 212 into the final set of label(s) 220. The labels label(s) 220 may eventually be used to form a benchmarking dataset 232 for evaluating effectiveness of one or more large language models and/or any other types of machine learning models at contextual analysis of electronic documents and/or at performing contextual extractions from electronic documents.

As can be understood, any types of requests may be submitted to the generative AI model(s) 218, resulting in generation of different types of labels for electronic documents. The generative AI model 218 may be part of the system 200 and/or be one or more third party models (e.g., ChatGPT, Bard, DALL-E, Midjourney, DeepMind, etc.).

In some embodiments, the generative AI model 218 may be provided with multiple electronic documents and/or any portions thereof along with one or more requests from one or more engines 210, 212 and may use the provided information to generate label sets 214. For example, the generative AI model 218 may be provided with a residential lease agreement, a commercial lease agreement, one or more portions of confidentiality agreements associated with parties mentioned in either of the lease agreements, various termination provisions, etc. and may be instructed to generate labels for entire agreements and/or for specific provisions of agreements (e.g., confidentiality provisions, etc.).

In generating labels, the electronic documents that may be analyzed by the generative AI model(s) 218 may be specific to a particular topic, type of documents, etc. (e.g., "lease agreements", "sales agreements", etc.) and/or may contain a particular provision (e.g., any agreements governed by the law of California, etc.). The queries or requests from engines 210, 212 to the generative AI model(s) 218 may be submitted in any desired language, code, form, etc. For instance, the requests to generate one or more labels that may be generated by the engine 210 may be in the form of "—You are a personal AI assistant."
"—User will give you a document which is a legal agreement or a part of a legal agreement."
"—Let us define Contextual Extraction to be a Key:Value pair which contains important aspects from the document that the user needs to pay the most attention to, such as {EXAMPLE_EXTRACTIONS}, etc. Most preferably hard facts from the document."
"—The Key must be a suitable tiny phrase or tiny topic name of the extracted content."
"—The Value must be a tiny entity or a tiny summary of the value content with a few words only."
"—If a Value is not specified or needs to be provided, use [BLANK] for the Value."
"—Extract the top {NUM_EXTRACTIONS} Contextual Extractions from the user-provided text."
"—The output must be 'Contextual Extractions:' followed by a maximum of {NUM_EXTRACTIONS} Contextual Extractions as Key:Value pairs presented as tiny and concise as possible."

A request to generate a content-based request that may be generated by the engine 212 may be in the form of "—You are a personal AI assistant."
"—User will give you a document which is a legal agreement or a part of a legal agreement."
"—Let us define Contextual Extraction to be a Key:Value pair which contains important aspects from the document that the user needs to pay the most attention to, such as {EXAMPLE_EXTRACTIONS}, etc. Most preferably hard facts from the document."
"—The Key must be a suitable tiny phrase or tiny topic name of the extracted content."
"—The Value must be a tiny entity or a tiny summary of the value content with a few words only."
"—If a Value is not specified or needs to be provided, use [BLANK] for the Value."
"—Extract at least the following comma separated Contextual Extractions from the user-provided text: {EXAMPLE_EXTRACTIONS}."
"—The output must be 'Contextual Extractions:' followed by a numbered list of Contextual Extractions as Key:Value pairs, each on a new line, presented as tiny and concise as possible."
"—If one of the following Contextual Extractions: {EXAMPLE_EXTRACTIONS} is not found, output it with an empty value."

As can be seen from examples above, the requests generated by the engine 212 include more specific context-based instructions that may be related to particular "EXAMPLE_EXTRACTIONS" and user-provided or identified text as well as output that may be sought as a result. The requests generated by the engine 210 might not be as specific and may seek "NUM_EXTRACTIONS" rather than context-related data.

As can be understood, the generative AI model 218 may be requested to generate any type of label sets 214. The current subject matter is not limited to the above examples.

Using the returned label sets 214, the label generation engine 216 may be configured to generate one or more labels 220, which may represent one or more combinations of labels generated in response to requests by engines 210 and/or 212. The label(s) 220 may be actual extracted paragraphs, sentences, phrases, words, alpha-numeric characters and/or any other portions of electronic documents. Alternatively, or in addition, the label(s) 220 may be any other type of labels that may be generated based on the extracted paragraphs, sentences, phrases, words, alpha-numeric characters and/or any other portions of electronic documents. Again, the label(s) 220 may be generic (e.g., related to any lease agreement) and/or may be context-based (e.g., related to specific content of the lease agreement, such as for example, specific parties, clauses, provisions, etc. of the lease agreement).

The label(s) 220 may be provided to the feedback engine 222 for review. The feedback engine 222 may execute a semantic-similarity, content, and/or subject matter review of the label(s) 220 versus the portions of the documents to which the label(s) has been assigned. The subject matter review may involve analyzing content of the label(s) 220 and corresponding portions of the electronic documents that have been labeled with one or more labels 220. The content-based subject matter review discard labels that incorrectly (or semantically mismatch or have unrelated content) label portions of the electronic documents (e.g., "termination label" assigned to "governing law of agreement" clause). If the label is correctly assigned then, it may be initially accepted. Additionally, a rule related to review of the labels may be generated by the rule(s) engine 224 (e.g., "if a clause of a document includes 'term', 'termination', then the label 'termination' should be assigned to that clause").

In some embodiments, the content-based subject matter review of the label(s) 220 may include user feedback. The review process may be executed by the feedback engine 222 once and/or continuously, such as, for example, upon receiving updated labels 220. The feedback may include, for example, a vote, written feedback, a "thumbs up", "thumbs down", etc. The feedback may be used to update, revise, modify, delete, change, and/or perform any other operations with regard to processes performed by the request generation engines 210, 212, label generation engine 216, and/or any other processes executed by the benchmarking dataset generation engine 150. Further, the feedback may be used in training any machine learning models that may be executed by any of the components of the benchmarking dataset generation engine 150. Alternatively, or in addition, the feedback may be used to update, revise, modify, delete, change, and/or perform any other operations with regard to a particular output that may have been generated during generation of labels 220. Such operations (e.g., updates, revision, etc. to how operations are performed and to the output) may be performed simultaneously, one after the other, and/or in any other desired fashion. Further, these operations may be executed in real-time, as soon as feedback is received, and/or at any other desired time. In some example embodiments, the feedback may be fed back into one or more of the previous phases, and may be used to adjust, for example, how labels 220 may be generated, how questions/queries, rephrased questions/queries/keywords, embeddings, may be generated and/or how responses may be extracted from the electronic documents, as well as how processing of specific tasks (and/or requests associated therewith) may be performed using the generative AI model, etc., where user feedback may be used to refine prompts submitted to the generative AI models, and/or for any other purpose(s).

The generated rules by the rule(s) engine 224 and the initial set of labels 220 reviewed by the feedback engine 222 may be sent to one or more feedback engine(s) 226 for further review. The review again may be content-based and/or user feedback back based, as discussed above. If the engine(s) 226 come to an agreement on a set of labels, a set of accepted label(s) 228 may be outputted. Otherwise, if there is no agreement as to a specific label for labeling a portion of electronic document(s), the label may be included in a set of rejected label(s) 230. One or both of the sets of labels 228, 230 may be used to form the benchmarking dataset 232.

In some example embodiments, the rule(s) engine 224 may rely on various methodologies to generate rules or guidelines for reviewing the labels 220. For example, one methodology may involve recall and precision methodology that may be based on top n label recommendations above a predetermined threshold t, whereby a recall parameter (R) may be determined as:

R=(number of top $n$ recommendations above a threshold $t$ that are answers)/(number of all answers)

A precision parameter (P) may be defined as:

P=(number of top $n$ recommendations above threshold $t$ that are answers)/(number of recommendations above threshold $t$)

The validation rule may be defined as follows:

Rule=2*R*P/(R+P)

Another methodology may involve a normalized discounted cumulative gain (NDCG) methodology. This methodology involves variable rel_i that may be defined as relevance of a returned result at position i. If irrelevant, it may be 0. Better answers may have higher relevance scores. NDCG may be defined as follows:

$$nDCG_p = \frac{DCG_p}{IDCG_p}$$

Where $$IDCG_p = \sum_{i=1}^{|REL_p|} \frac{2^{rel_i} - 1}{\log_2(i+1)}$$

Any results may be sorted by relevance, where IDCG may refer to the best possible discounted cumulative gain score that may be received. The DCG may be defined as follows:

$$DCG_p = \sum_{i=1}^{p} \frac{2^{rel_i} - 1}{\log_2(i+1)}$$

The NDCG may be limited as compared to recall and precision methodology discussed above, as it does not penalize for bad documents in the results (which may be addressed by the precision), and it does not penalize missing documents in the results (which may be addressed by the recall).

The set of accepted label(s) 228 may form a benchmarking dataset 232 of labels. Such benchmarking dataset of labels may then be used to train and/or evaluate one or more large language models. For example, the benchmarking dataset 232 may determine whether a particular large language model is correctly labeling portions of electronic documents. If labels are incorrectly assigned by the large language model, the model may be deemed as ineffective and/or untrained. The benchmarking dataset 232 may then be used to train the model. As can be understood, effectiveness of a particular large language model may be determined on a case-by-case basis, where one or more effectiveness thresholds may be defined to indicate whether or not a particular model is effective and thus, may be used to process an electronic document.

As discussed above, the benchmarking dataset generation engine 150 may be configured to rely on one or more machine learning models. For example, such models may be used to generate queries related to electronic documents, generate labels, etc. The models may be used for generation of prompts to the generative AI model(s) 218 for generation of label sets 214, as well as for performing of any other tasks by the benchmarking dataset generation engine 150.

Figure 3:
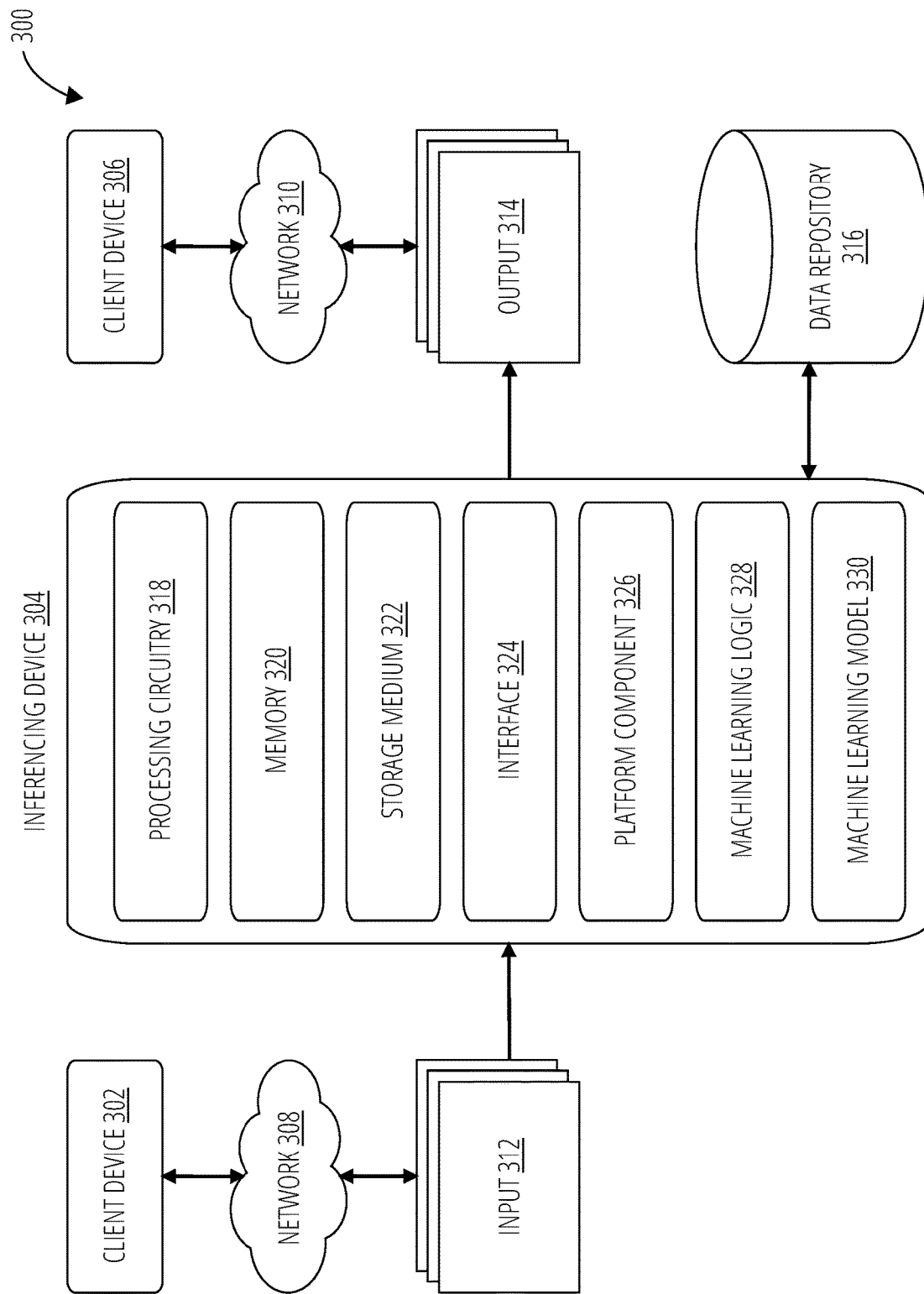
FIG. 3 illustrates an example of an AI/ML system that may be used for generating one or more transaction packages and/or guiding the user through one or more tasks, documents, etc., according to some embodiments of the current subject matter.

FIG. 3 illustrates an example of an AI/ML system 300 that may be used by the benchmarking dataset generation engine 150, according to some embodiments of the current subject matter. The system 300 may include a set of M devices, where M is any positive integer. As shown in FIG. 3, the system 300 may include three devices (M=3), such as a client device 302, an inferencing device 304, and a client device 306. The inferencing device 304 may communicate information with the client device 302 and the client device 306 over a network 308 and a network 310, respectively. The information may include input 312 from the client device 302 and output 314 to the client device 306, or vice-versa. In some embodiments, the input 312 and the output 314 may be communicated between the same client device 302 or client device 306. In another alternative, the input 312 and the output 314 may be stored in a data repository 316. Alternatively, or in addition, the input 312 and the output 314 are communicated via a platform component 326 of the inferencing device 304, such as an input/output (I/O) device (e.g., a touchscreen, a microphone, a speaker, etc.).

As shown in FIG. 3, the inferencing device 304 may include a processing circuitry 318, a memory 320, a storage medium 322, an interface 324, a platform component 326, ML logic 328, and an ML model 330. In some embodiments, the inferencing device 304 may include other components and/or devices as well. Examples for software elements and hardware elements of the inferencing device 304 are described in more detail with reference to a computing architecture 1700 as depicted in FIG. 17. Embodiments are not limited to these examples.

The inferencing device 304 may generally be arranged to receive an input 312, process the input 312 via one or more AI/ML techniques, and send an output 314. The inferencing device 304 may receive the input 312 from the client device 302 via the network 308, the client device 306 via the network 310, the platform component 326 (e.g., a touchscreen as a text command or microphone as a voice command), the memory 320, the storage medium 322 or the data repository 316. The inferencing device 304 may send the output 314 to the client device 302 via the network 308, the client device 306 via the network 310, the platform component 326 (e.g., a touchscreen to present text, graphic or video information or speaker to reproduce audio information), the memory 320, the storage medium 322 or the data repository 316. Examples for the software elements and hardware elements of the network 308 and the network 310 are described in more detail with reference to a communications architecture 1800 as depicted in FIG. 18. Embodiments are not limited to these examples.

The inferencing device 304 may include ML logic 328 and an ML model 330 to implement various AI/ML techniques for various AI/ML tasks. The ML logic 328 may receive the input 312 and process the input 312 using the ML model 330. The ML model 330 may perform inferencing operations to generate an inference for a specific task from the input 312. In some embodiments, the inference is part of the output 314. The output 314 may be used by the client device 302, the inferencing device 304, or the client device 306 to perform subsequent actions in response to the output 314.

In some embodiments, the ML model 330 may be a trained ML model 330 using a set of training operations. An example of training operations to train the ML model 330 is described with reference to FIG. 4.

Figure 4:
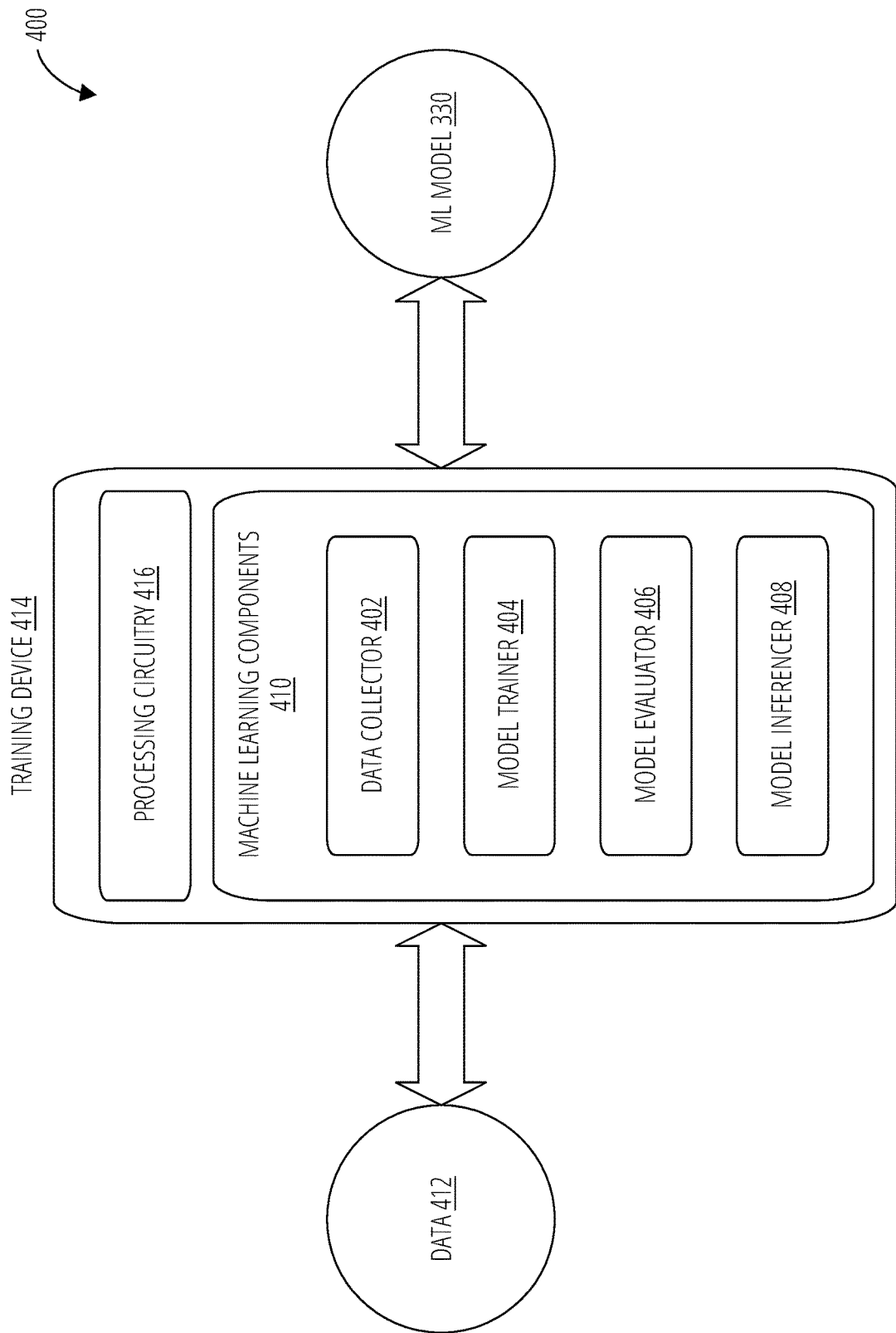
FIG. 4 illustrates an example apparatus that may include a training device suitable to generate a trained ML model for the inferencing device of the system shown in FIG. 3.

FIG. 4 illustrates an example apparatus 400 that may include a training device 414 suitable to generate a trained ML model 330 for the inferencing device 304 of the system 300. As shown in FIG. 4, the training device 414 may include a processing circuitry 416 and a set of ML components 410 to support various AI/ML techniques, such as a data collector 402, a model trainer 404, a model evaluator 406 and a model inferencer 408.

In general, the data collector 402 may collect data 412 from one or more data sources to use as training data for the ML model 330. The data collector 402 may collect different types of data 412, such as, text information, audio information, image information, video information, graphic information, and so forth. The model trainer 404 may receive as input the collected data and uses a portion of the collected data as test data for an AI/ML algorithm to train the ML model 330. The model evaluator 406 may evaluate and improve the trained ML model 330 using a portion of the collected data as test data to test the ML model 330. The model evaluator 406 may also use feedback information from the deployed ML model 330. The model inferencer 408 may implement the trained ML model 330 to receive as input new unseen data, generate one or more inferences on the new data, and output a result such as an alert, a recommendation or other post-solution activity.

An exemplary AI/ML architecture for the ML components 410 is described in more detail with reference to FIG. 5.

FIG. 5 illustrates an artificial intelligence architecture 500 that may be used by the training device 414 to generate the ML model 330 (e.g., one or more models that may be used by the benchmarking dataset generation engine 150 for generation of queries/questions/keywords, embeddings, etc. as related to electronic documents received from data sources 202, 204, etc.) for deployment by the inferencing device 304. The artificial intelligence architecture 500 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 500 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 330, evaluate performance of the trained ML model 330, and deploy the tested ML model 330 as the trained ML model 330 in a production environment, and continuously monitor and maintain it.

The ML model 330 may be a mathematical construct used to predict outcomes based on a set of input data. The ML model 330 may be trained using large volumes of training data 526, and it can recognize patterns and trends in the training data 526 to make accurate predictions. The ML model 330 may be derived from an ML algorithm 524 (e.g., a neural network, decision tree, support vector machine, etc.). A data set is fed into the ML algorithm 524 which trains an ML model 330 to "learn" a function that produces mappings between a set of inputs and a set of outputs with a reasonably high accuracy. Given a sufficiently large enough set of inputs and outputs, the ML algorithm 524 may find the function for a given task. This function may even be able to produce the correct output for input that it has not seen during training. A data scientist prepares the mappings, selects and tunes the ML algorithm 524, and evaluates the resulting model performance. Once the ML logic 328 is sufficiently accurate on test data, it can be deployed for production use.

The ML algorithm 524 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 524 of the artificial intelligence architecture 500 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 5, the artificial intelligence architecture 500 includes a set of data sources 502 to source data 504 for the artificial intelligence architecture 500. Data sources 502 may comprise any device capable generating, processing, storing or managing data 504 suitable for a ML system. The data sources 502 may receive data 550 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 550 may also be supplied during training phase of the model. Some additional, non-limiting, examples of data sources 502 include without limitation databases, web scraping, sensors and Internet of Things (IoT) devices, image and video cameras, audio devices, text generators, publicly available databases, private databases, and many other data sources 502. The data sources 502 may be remote from the artificial intelligence architecture 500 and accessed via a network, local to the artificial intelligence architecture 500 an accessed via a network interface or may be a combination of local and remote data sources 502.

The data sources 502 source difference types of data 504 (which may include data 550 related to documents, transactions, etc.). By way of example and not limitation, the data 504 includes structured data from relational databases, such as customer profiles, transaction histories, or product inventories. The data 504 includes unstructured data from websites such as customer reviews, news articles, social media posts, or product specifications. The data 504 includes data from temperature sensors, motion detectors, and smart home appliances. The data 504 includes image data from medical images, security footage, or satellite images. The data 504 includes audio data from speech recognition, music recognition, or call centers. The data 504 includes text data from emails, chat logs, customer feedback, news articles or social media posts. The data 504 includes publicly available datasets such as those from government agencies, academic institutions, or research organizations. These are just a few examples of the many sources of data that can be used for ML systems. It is important to note that the quality and quantity of the data is critical for the success of a machine learning project.

The data 504 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 502 may be communicatively coupled to a data collector 402. The data collector 402 may gather relevant data 504 from the data sources 502. Once collected, the data collector 402 may use a pre-processor 506 to make the data 504 suitable for analysis. This may involve data cleaning, transformation, and feature engineering. Data pre-processing is a critical step in ML as it directly impacts the accuracy and effectiveness of the ML model 330. The pre-processor 506 receives the data 504 as input, processes the data 504, and outputs pre-processed data 516 for storage in a database 508. Examples for the database 508 includes a hard drive, solid state storage, and/or random-access memory (RAM).

The data collector 402 is communicatively coupled to a model trainer 404. The model trainer 404 may perform AI/ML model training, validation, and testing which may generate model performance metrics as part of the model testing procedure. The model trainer 404 may receive the pre-processed data 516 as input 510 or via the database 508. The model trainer 404 may implement a suitable ML algorithm 524 to train an ML model 330 on a set of training data 526 from the pre-processed data 516. The training process may involve feeding the pre-processed data 516 into the ML algorithm 524 to produce or optimize an ML model 330. The training process may adjust its parameters until it achieves an initial level of satisfactory performance.

The model trainer 404 may be communicatively coupled to a model evaluator 406. After an ML model 330 is trained, the ML model 330 may need to be evaluated to assess its performance. This is done using various metrics such as accuracy, precision, recall, and F1 score. The model trainer 404 may output the ML model 330, which is received as input 510 or from the database 508. The model evaluator 406 may receive the ML model 330 as input 512, and it initiates an evaluation process to measure performance of the ML model 330. The evaluation process may include providing feedback 518 to the model trainer 404. The model trainer 404 may re-train the ML model 330 to improve performance in an iterative manner.

The model evaluator 406 may be communicatively coupled to the model inferencer 408. The model inferencer 408 may provide AI/ML model inference output (e.g., inferences, predictions or decisions). Once the ML model 330 is trained and evaluated, it may be deployed in a production environment where it is used to make predictions on new data. The model inferencer 408 may receive the evaluated ML model 330 as input 514. The model inferencer 408 may use the evaluated ML model 330 to produce insights or predictions on real data, which may be deployed as a final production ML model 330. The inference output of the ML model 330 may be use case specific. The model inferencer 408 may also perform model monitoring and maintenance, which involves continuously monitoring performance of the ML model 330 in the production environment and making any necessary updates or modifications to maintain its accuracy and effectiveness. The model inferencer 408 may provide feedback 518 to the data collector 402 to train or re-train the ML model 330. The feedback 518 may include model performance feedback information, which may be used for monitoring and improving performance of the ML model 330.

Some or all of the model inferencer 408 may be implemented by various actors 522 in the artificial intelligence architecture 500, including the ML model 330 of the inferencing device 304, for example. The actors 522 may use the deployed ML model 330 on new data to make inferences or predictions for a given task and output an insight 532. The actors 522 may implement the model inferencer 408 locally, or remotely receives outputs from the model inferencer 408 in a distributed computing manner. The actors 522 may trigger actions directed to other entities or to itself. The actors 522 provide feedback 520 to the data collector 402 via the model inferencer 408. The feedback 520 may include data needed to derive training data, inference data or to monitor the performance of the ML model 330 and its impact to the network through updating of key performance indicators (KPIs) and performance counters.

As discussed above, the systems 100, 300 implement some or all of the artificial intelligence architecture 500 to support various use cases and solutions for various AI/ML tasks. In some embodiments, the training device 414 of the apparatus 400 may use the artificial intelligence architecture 500 to generate and train the ML model 330 for use by the inferencing device 304 for the system 100. In one embodiment, for example, the training device 414 may train the ML model 330 as a neural network, as described in more detail with reference to FIG. 6. Other use cases and solutions for AI/ML are possible as well, and embodiments are not limited in this context.

Figure 6:
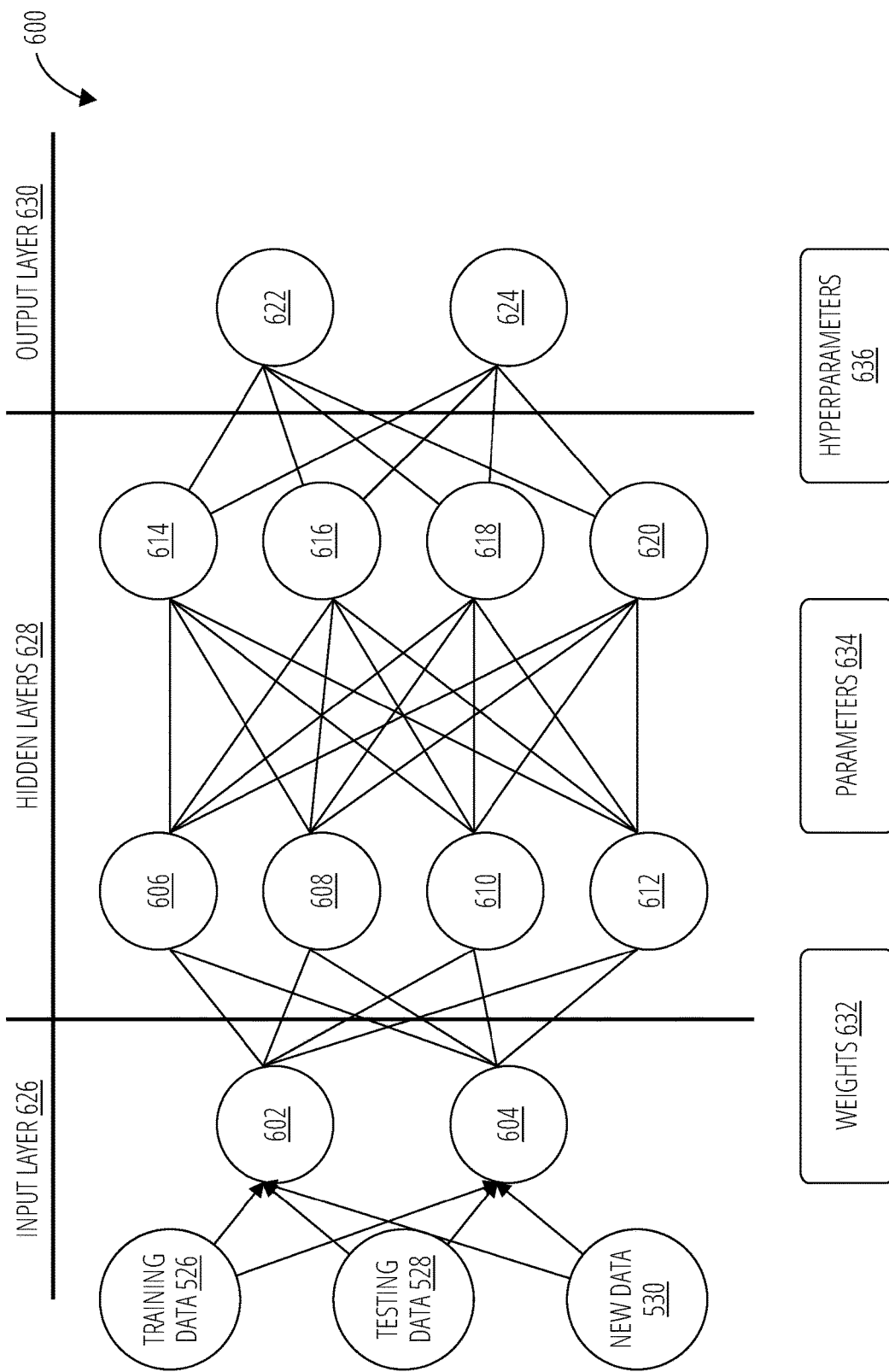
FIG. 6 illustrates an artificial neural network in accordance with one embodiment.

FIG. 6 illustrates an embodiment of an artificial neural network 600. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 600 may include multiple node layers, containing an input layer 626, one or more hidden layers 628, and an output layer 630. Each layer comprises one or more nodes, such as nodes 602 to 624. As shown in FIG. 6, for example, the input layer 626 may include nodes 602, 604. The artificial neural network 600 may include two hidden layers 628, with a first hidden layer having nodes 606, 608, 610 and 612, and a second hidden layer having nodes 614, 616, 618 and 620. The artificial neural network 600 may include an output layer 630 with nodes 622, 624. Each node 602 to 624 may include a processing element (PE), or artificial neuron, which connects to another and has an associated weight and threshold. If the output of any individual node is above the specified threshold value, that node may be activated, sending data to the next layer of the network. Otherwise, no data is passed along to the next layer of the network.

In general, artificial neural network 600 may rely on training data 526 to learn and improve accuracy over time. However, once the artificial neural network 600 may be fine-tuned for accuracy, and tested on testing data 528, the artificial neural network 600 may be ready to classify and cluster new data 530 at a high velocity. Tasks in speech recognition or image recognition can take minutes versus hours when compared to the manual identification by human experts.

Each individual node 602 to 424 may be a linear regression model, composed of input data, weights, a bias (or threshold), and an output. The linear regression model may have a formula similar to Equation (1), as follows:

$$\Sigma w_i x_i + bias = w_1 x_1 + w_2 x_2 + w_3 x_3 + bias$$

$$output = f(x) = 1 \text{ if } \Sigma w_1 x_1 + b >= 0; 0 \text{ if } \Sigma w_1 x_1 + b < 0 \quad \text{EQUATION (1)}$$

Once an input layer 626 is determined, a set of weights 632 may be assigned. The weights 632 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 600 as a feedforward network.

In some embodiments, the artificial neural network 600 may leverage sigmoid neurons, which are distinguished by having values between 0 and 1. Since the artificial neural network 600 behaves similarly to a decision tree, cascading data from one node to another, having x values between 0 and 1 will reduce the impact of any given change of a single variable on the output of any given node, and subsequently, the output of the artificial neural network 600.

The artificial neural network 600 may have many practical use cases, like image recognition, speech recognition, text recognition or classification. The artificial neural network 600 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \quad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 634 of the model adjust to gradually converge at the minimum.

In one embodiment, the artificial neural network 600 is feedforward, meaning it flows in one direction only, from input to output. In one embodiment, the artificial neural network 600 uses backpropagation. Backpropagation is when the artificial neural network 600 moves in the opposite direction from output to input. Backpropagation allows calculation and attribution of errors associated with each neuron 602 to 624, thereby allowing adjustment to fit the parameters 634 of the ML model 330 appropriately.

The artificial neural network 600 is implemented as different neural networks depending on a given task. Neural networks are classified into different types, which are used for different purposes. In one embodiment, the artificial neural network 600 is implemented as a feedforward neural network, or multi-layer perceptrons (MLPs), comprised of an input layer 626, hidden layers 628, and an output layer 630. While these neural networks are also commonly referred to as MLPs, they are actually comprised of sigmoid neurons, not perceptrons, as most real-world problems are nonlinear. Trained data 504 usually is fed into these models to train them, and they are the foundation for computer vision, natural language processing, and other neural networks. In one embodiment, the artificial neural network 600 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 600 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 600 is implemented as any type of neural network suitable for a given operational task of system 100, and the MLP, CNN, and RNN are merely a few examples. Embodiments are not limited in this context.

The artificial neural network 600 may include a set of associated parameters 634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 600 may be implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 636. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 7 illustrates an example of a document corpus 708 suitable for use by the benchmarking dataset generation engine 150 of the server device 102. The document corpus 708 may be stored in one or more database and/or storage locations and may be accessible (e.g., via a query) by the benchmarking dataset generation engine 150. In general, a document corpus is a large and structured collection of electronic documents, such as text documents, which are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 7, the document corpus 708 may include information from electronic documents 718 derived from the document records 138 stored in the data store 126. The electronic documents 718 may include any electronic document having metadata such as STME 132 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using the AI/ML techniques described herein. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system 100 during a document generation process. In one embodiment, the sets and subsets of electronic documents 718 may be unlabeled.

Figure 8:
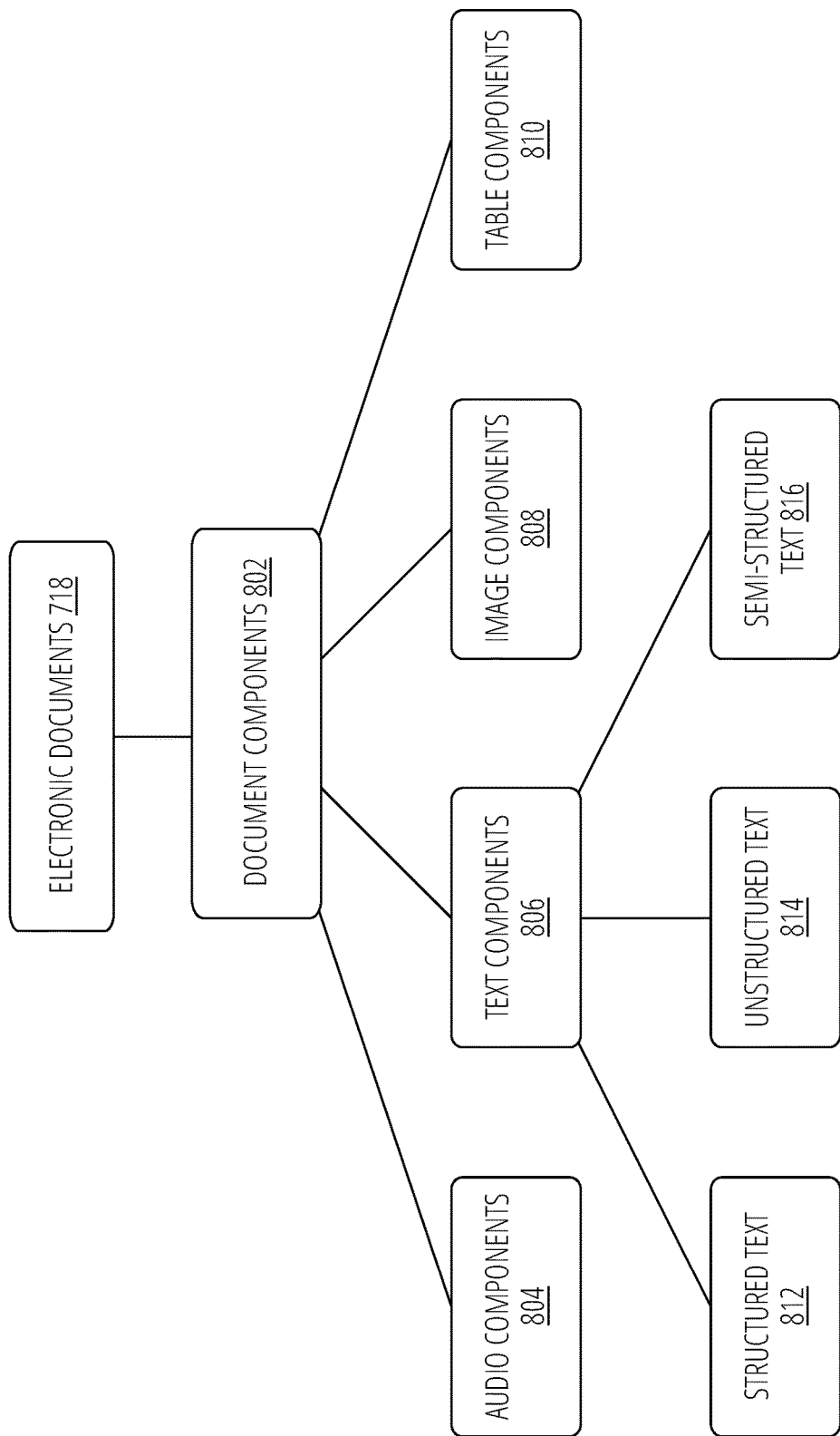
FIG. 8 illustrates electronic documents in accordance with one embodiment.

FIG. 8 illustrates an example of an electronic document 718. An electronic document 718 may include different information types that collectively form a set of document components 802 for the electronic document 718. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 9:
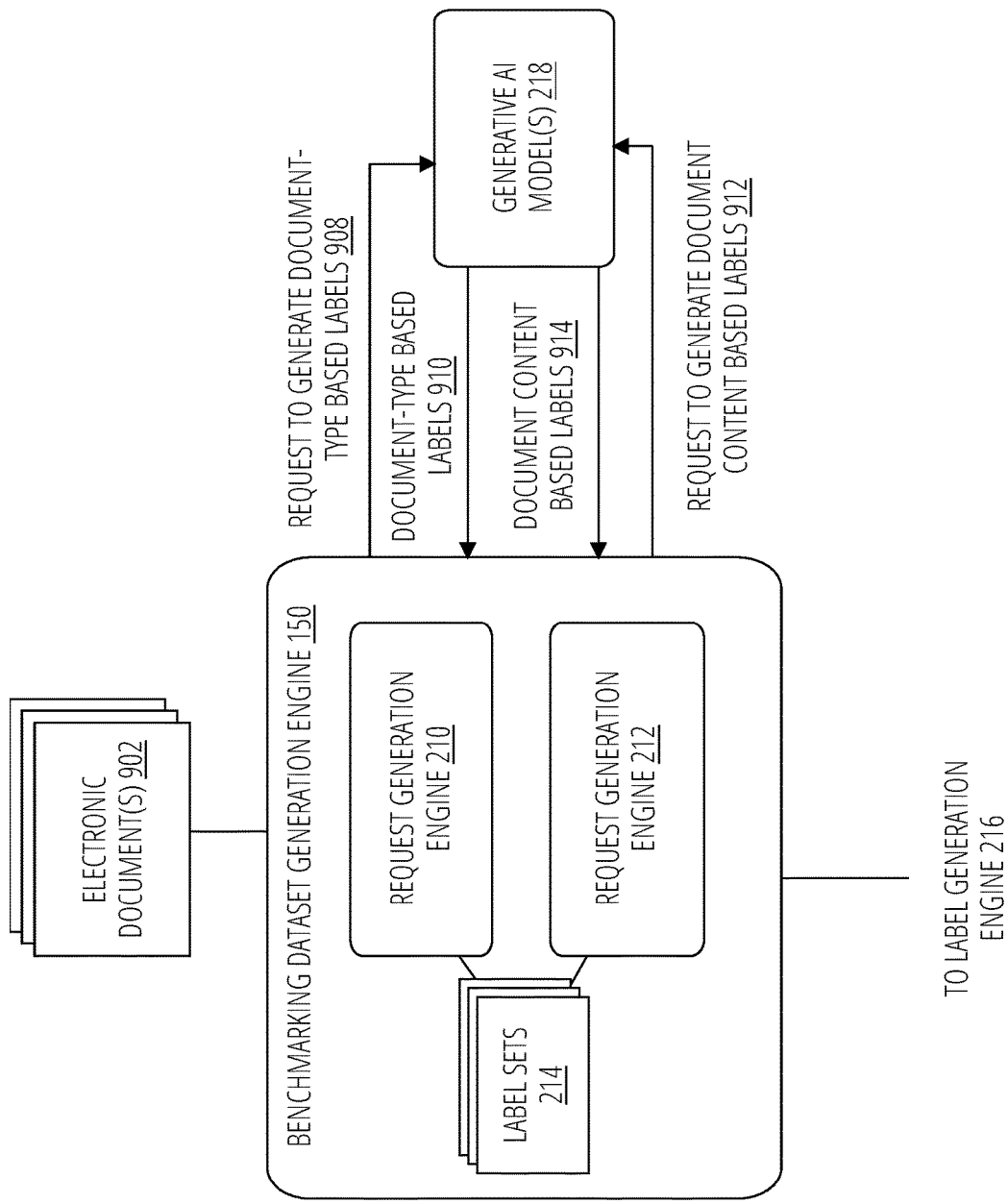
FIG. 9 illustrates an example of operation of the request generation engines, according to some embodiments of the current subject matter.

FIG. 9 illustrates an example of operation of the request generation engines 210 and 212, according to some embodiments of the current subject matter. The request generation engine 210 may receive one or more electronic document(s) 902 as well as respective types of documents 902 from document type determination engine 206 (as shown in FIG. 2). The electronic document(s) 902 may be retrieved from one or more data sources, e.g., data sources 202, 204, as shown in FIG. 2. The electronic document(s) 902 may be unprocessed (e.g., as stored in data source 204) and/or processed (e.g., as stored in data source 202). Alternatively, or in addition, the engine 210 may receive the electronic document(s) 902 directly from one or more of the data sources 202, 204 and determine their respective types.

The request generation engine 212 may also receive one or more electronic document(s) 902 (which may be the same or different documents as those that are received by engine 210) as well as content information of documents 902 from document content analyzing engine 208 (as shown in FIG. 2). Alternatively, or in addition, the engine 212 may receive the electronic document(s) 902 directly from one or more of the data sources 202, 204 and determine their respective contents.

Upon receiving of the electronic document(s) 902 and types of documents, the engine 210 may be configured to analyze the documents and generate one or more requests to generate document-type based labels 908 for submission to the generative AI model(s) 218 so that one or more document-type based labels 910 may be generated by the model(s) 218. The request 908 generated by the engine 210 may include the electronic document and a type of electronic document (e.g., a lease agreement, a master services agreement, etc.). In some example embodiments, the request 908 may also include various metadata and/or other data associated with the electronic document, e.g., a source of the document (e.g., public databases, private databases, etc.), one or more entities involved in the document (e.g., parties to the agreement, etc.), and/or any other information. In some embodiments, the engine 210 may execute one or more machine learning models to retrieve the information that it needs to generate the request 908 to the generative AI model(s) 218.

The request 908 may be in any desired form, language, format, etc. For example, the request may be formatted using natural language processing. Alternatively, or in addition, a query language (e.g., SQL, etc.) may be used to form the request 908 and transmit it to the generative AI model(s) 218. The request may specify how (e.g., format, size, type of response, etc.) the engine 908 wishes to receive a response from the generative AI model(s) 218 and/or any information that may be associated with the response. For example, the request 908 may state: "Generate labels for any lease agreement." The request 908 may include the electronic document 902 for which the generative AI model(s) 218 is being asked to generate document-type labels. As stated above, the generative AI models 218 may be part of the current subject matter system (e.g., system 200 shown in FIG. 2) and/or be one or more third party models (e.g., ChatGPT, Bard, DALL-E, Midjourney, DeepMind, etc.).

Once the generative AI model(s) 218 receives the request 908, it may perform any analysis that may typically be performed by a generative AI model and respond with document-type based labels 910 that may be sent back to the request generation engine 210. The labels 910 may form part of the label sets 214.

The request generation engine 212 may generate one or more requests to generate document-content based labels 912 for submission to the generative AI model(s) 218 so that one or more document content-based labels 914 may be generated by the model(s) 218. The request 912 generated by the request generation engine 212 may include the electronic document and information related to the content of the electronic document (e.g., a lease agreement between party A and party B, termination and jurisdiction clauses are included, etc.). In some example embodiments, the request 912 may likewise include metadata and/or other document context-based data associated with the electronic document. In some embodiments, the engine 212 may execute one or more machine learning models to retrieve the information that it needs to generate the request 912 to the generative AI model(s) 218.

Similar to the request 908, the request to generate document content-based labels 912 may be in any desired form, language, format, etc. (e.g., natural language processing, a query language (e.g., SQL, etc.), etc.). The request 912 may then be sent by the engine 212 to the generative AI model(s) 218. The request may also specify how (e.g., format, size, type of response, etc.) the engine 212 wishes to receive a response from the generative AI model(s) 218 and/or any information that may be associated with the response. For example, the request 912 may state: "Generate labels for the lease agreement, dated Jan. 1, 2023, between parties A and B, for premises located at 123 Main Street. Include labels for termination and jurisdiction clauses." The request 912 may include the electronic document 902 for which the generative AI model(s) 218 is being asked to generate content-based labels 914. Once the generative AI model(s) 218 receives the request 912, it may perform any analysis that may typically be performed by a generative AI model and respond with document-content based labels 914 that may be sent back to the request generation engine 212. The labels 914 may form part of the label sets 214. As can be understood, the engines 210, 212 may form a single engine and/or be separate engines performing the functionalities discussed herein.

Figure 10:
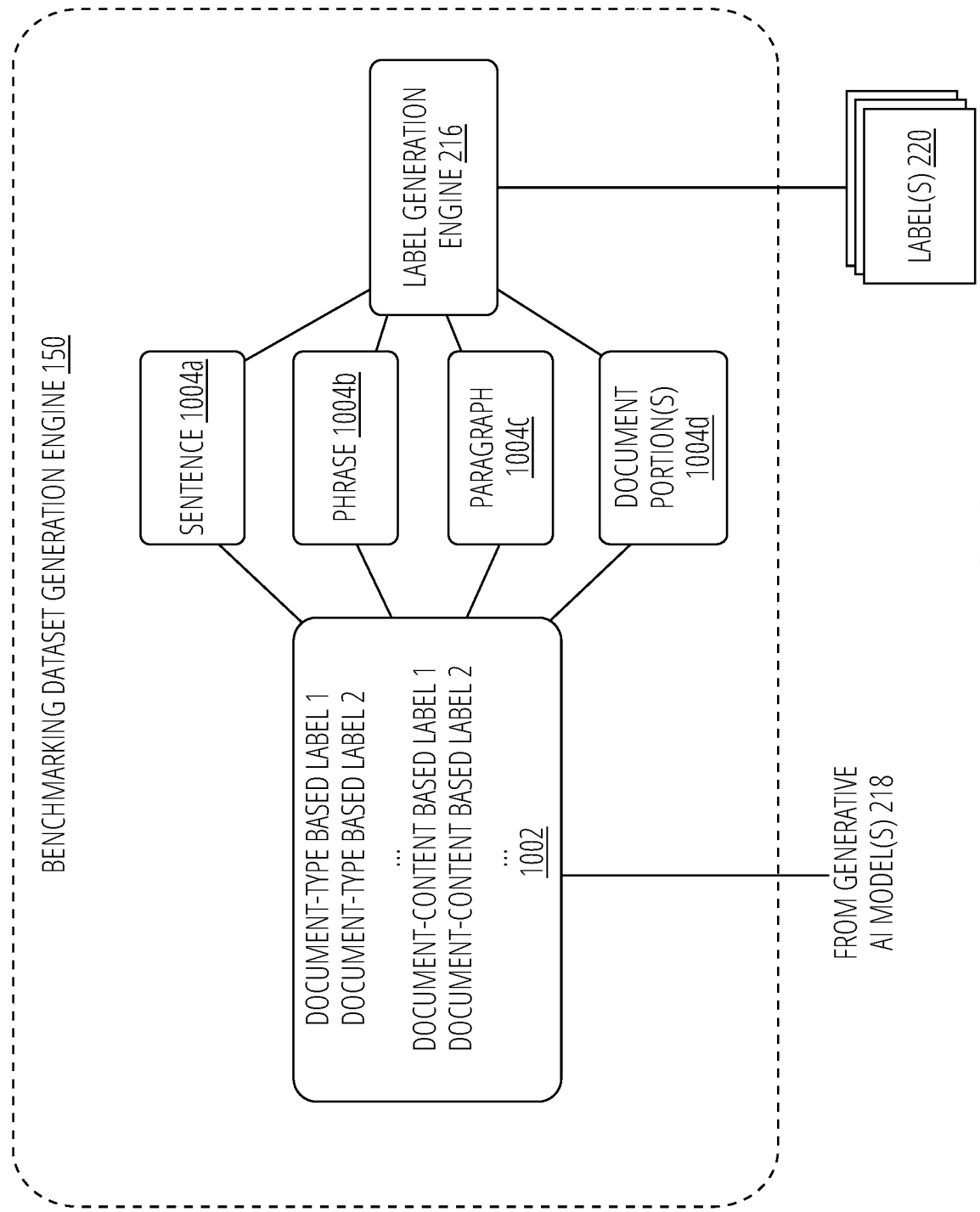
FIG. 10 illustrates an example process for generating one or more document label(s) based on labels generated by a generative AI model(s), according to some embodiments of the current subject matter.

FIG. 10 illustrates an example process for generating one or more document label(s) 220 based on labels 910, 914 generated by the generative AI model(s) 218, according to some embodiments of the current subject matter. As discussed herein, the label generation process may be executed by the benchmarking dataset generation engine 150. The engine 150 may be configured to receive one or more document-type based labels 1, 2, . . . , document content-based labels 1, 2, . . . 1002 from the generative AI model(s) 218 as a result of operations executed by one or more of the request generation engines 210 and/or 212. Labels 1002 may form label sets 214.

The labels 1002 may include, but are not limited to, sentences 1004a, phrases 1004b, paragraphs 1004c, and/or any other document portion(s) 1004d. For example, the generative AI model(s) 218 may extract a label that may be a sentence 1004a stating "The term of this agreement is 1 year." which may be used as a label and/or used for generation of a label, e.g., "term". The generative AI model(s) 218 may extract a paragraph 1004c stating "This agreement shall be governed by the law of the State of California. Any disputes specifically related to non-payment shall be governed by the law of the State of New York." Again, this paragraph 1004c may be used in its entirety as a label and/or used to generate a label, e.g., "law". As can be understood, any other portions(s) 1004 of electronic documents may be generated.

To generate the labels, the portion(s) 1104 may be provided to the label generation engine 216. The label generation engine 216 may, in turn, use the portion(s) 1104 to generate one or more labels 220. The labels may be the portion(s) 1104 may be based on one or more labels 1002 that may be received from the generative AI model(s) 218 and may form label sets 214. Alternatively, or in addition, the labels may be specific identifiers, terms, etc. that may be determined based on the portion(s) 1004. For example, for the response "The term of this agreement is 1 year.", the label generation engine 216 may generate a label "term" and/or "termination". As can be understood, any type of labels 220 may be generated by the label generation engine 216.

As discussed above in connection with FIG. 2, the generated label(s) 220 may be provided to the feedback engine 222, which may use semantic-similarity analysis, content-based analysis and/or subject matter analysis of the provided label(s) 220 to determine whether the label(s) 220 are acceptable or not. Moreover, the rule(s) engine 224 may generate one or more rules for reviewing the labels (e.g., label "term" is acceptable to label a portion of the document related to termination (e.g., "The term of this agreement is 1 year"), but it is not acceptable to label a portion of the document related to governing law). The rules may be used by the feedback engine 222 to review newly generated label(s) 220 by the label generation engine 216 and/or by additional feedback engine(s) 226 in reviewing label(s) 220 that have already been reviewed by the engine 222.

Once the feedback engine(s) 226 reviewed the labels using rules generated by the rule(s) engine 224, the engine(s) 226 may determine which labels are acceptable (e.g., accepted label(s) 228) and which should be discarded (e.g., rejected label(s) 230). In some embodiments, the accepted label(s) 228 may form a benchmarking dataset 232. The benchmarking dataset may be used to train and/or evaluate a large language model. The benchmarking dataset 232 may be specific to a particular model, particular type of electronic documents (e.g., lease agreements, sales agreements, etc.), etc. Alternatively, or in addition, the benchmarking dataset 232 may be model and/or electronic document agnostic, i.e., it may be used to evaluate any type of model and/or any type of electronic document. Further, the benchmarking dataset 232 may also include the rejected label(s) 230, which may indicate which labels are not to be used to label certain portions of electronic documents.

In some embodiments, the benchmarking dataset 232 may be used to train a machine learning model so that a ground truth labels (e.g., key-value pairs) may be generated by the trained model. The ground truth model may be used to assess other machine learning models (e.g., large language models, generative AI models, etc.) by comparing the labels generated by such machine learning models to the ground truth labels generated by the ground truth model, as discussed herein. Based on the comparison, an effectiveness and accuracy of the machine learning models may be determined.

Figure 11:
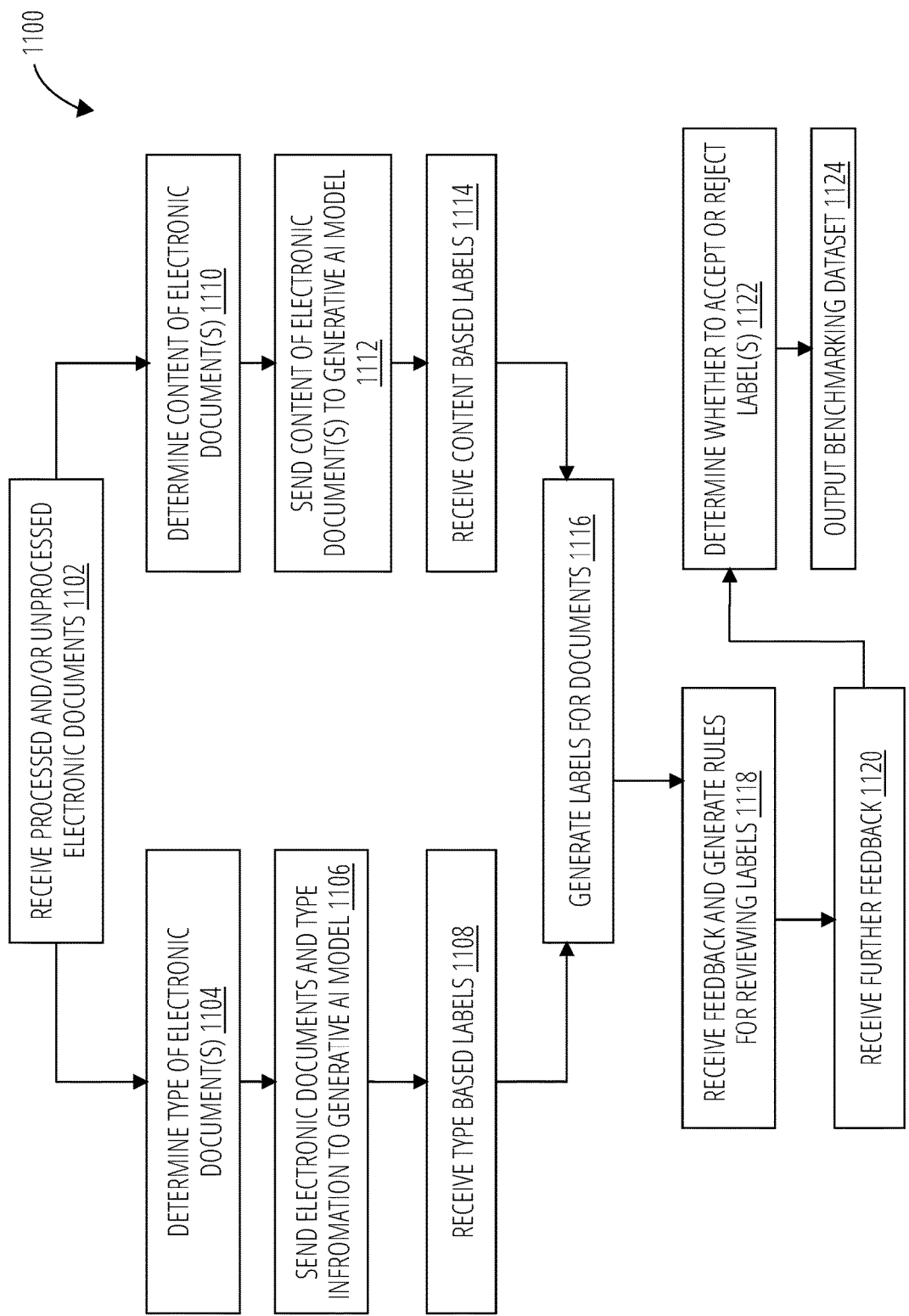
FIG. 11 illustrates an example process for generating a benchmarking dataset, according to some embodiments of the current subject matter.

FIG. 11 illustrates an example process 1100 for generating a benchmarking dataset 232, according to some embodiments of the current subject matter. In the process 1100, one or more operations 1104-1108 may be executed by the request generation engine 210 and/or operations 1110-1114 may be executed by the request generation engine 212, operation(s) 1116 may be executed by the label generation engine 216, and operation(s) 1118-1124 may be executed by feedback engines 222, 226, as shown in FIG. 2. One or more of operations 1102-1124 may be executed simultaneously (or substantially simultaneously) and/or one after the other. Moreover, operations 1102-1124 may be executed as soon as output of one or more sets of previously executed operations 1102-1124 is received and/or upon all operations 1102-1124 are completed, and/or in any other manner.

At 1102, the request generation engine 210 and/or the request generation engine 212 may be configured to receive processed and/or unprocessed electronic documents. The documents may be received from one or more data sources 202 and/or 204.

The request generation engine 210 may optionally be configured to analyze the electronic documents to determine type of documents (e.g., lease agreements, sales agreements, etc.), at 1104. The request generation engine 210 may form one or more requests to the generative AI model(s) 218 to generate one or more requests 908 to generate document-type based labels of the electronic documents. The request 908, along with the retrieved electronic document(s), may be sent to the generative AI model(s) 218, at 1106.

The request generation engine 212 may also be configured to process electronic document(s) from sources 202 and/or 204. The engine 212 may be configured to analyze content(s) of electronic documents, at 1110, and generate one or more requests 912 to generate document content-based labels to the generative AI model(s) 218, at 1112.

The generative AI model(s) 218 may ingest the requests (e.g., requests 908 and/or 912) and the electronic document(s) and execute analysis of the requests and the document(s). In response to the analysis, the generative AI model(s) 218 may provide one or more document-type based labels 910 to the request generation engine 210, at 1108, and one or more document content-based labels 914 to the request generation engine 212, at 1114.

The labels, which may form one or more label sets 214, may be used by the label generation engine 216 to generate one or more label(s) 220, at 1116. The labels may be and/or may be generated based on alpha-numeric characters, words, sentences, phrases, paragraphs, and/or any other portions of electronic documents.

At 1118, the label(s) 220 may be reviewed by the feedback engine 222. The feedback engine 222 may execute a subject-matter review of the labels, e.g., analyze content of the label(s) 220, to determine whether label(s) 220 are properly labeling a particular portion of the electronic document(s). Further, one or more rules for reviewing labels may also be generated by the rule(s) engine 224. The rules may indicate whether a label is acceptable based on the content of the label and/or the content of the portion of electronic document to which it is assigned.

At 1120, further feedback on the label(s) 220 may be received as result of one or more feedback engine(s) 226 executing analysis of the label(s) 220. This analysis may be executed using rules generated by the rule(s) engine 224. The feedback engine(s) 226 may determine (upon an agreement) that a particular label 220 may be acceptable, thereby forming a set of accepted label(s) 228 and/or unacceptable, thereby forming a set of rejected label(s) 230, at 1122. One or more both of the accepted label(s) 228 and/or rejected label(s) 230 may form a benchmarking dataset 232, at 1124. As discussed herein, there benchmarking dataset 232 may be used to evaluate and/or train one or more large language models.

Figure 12:
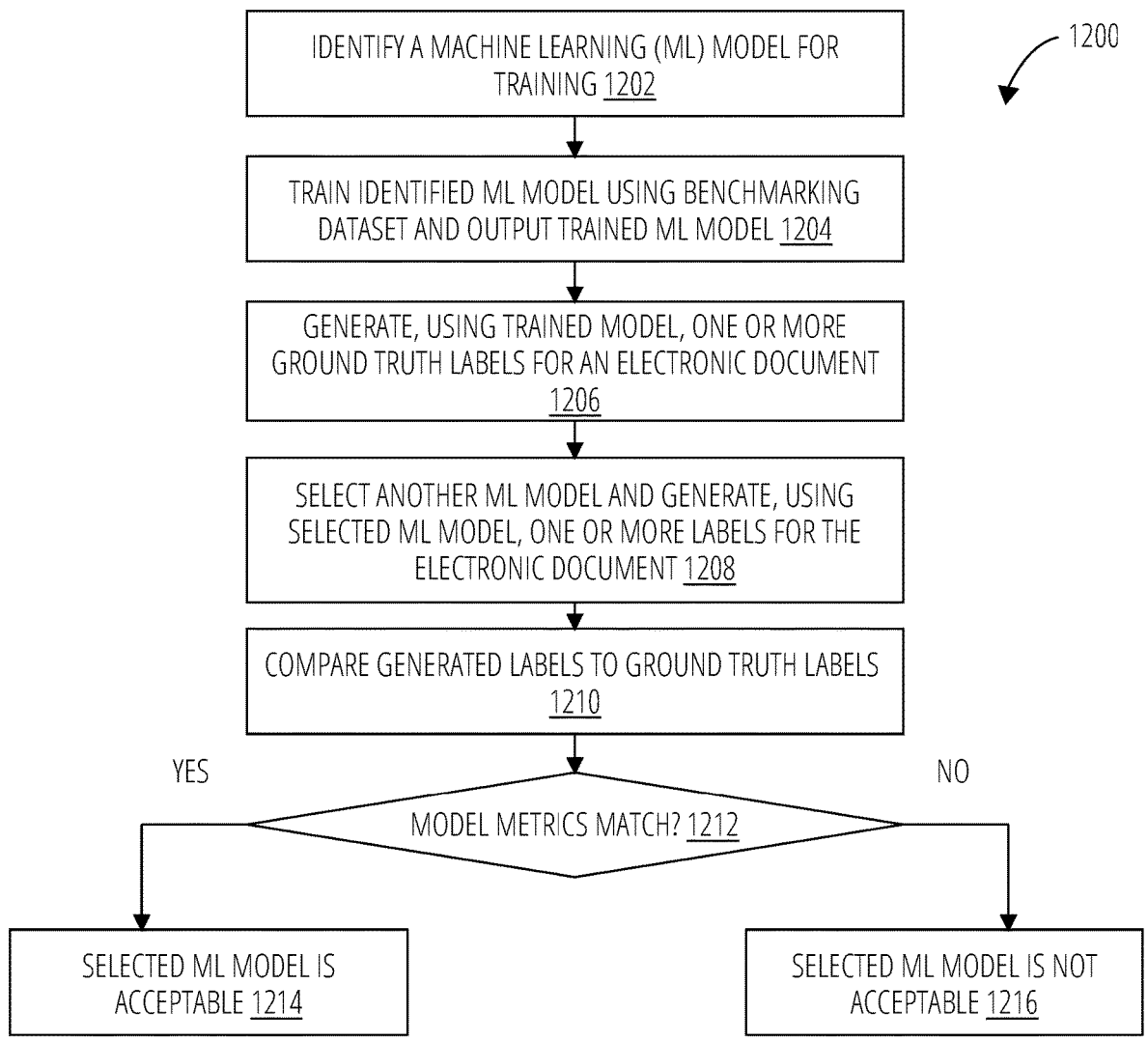
FIG. 12 illustrates an example process for evaluating one or more machine learning models using the generated benchmarking dataset, according to some embodiments of the current subject matter.

FIG. 12 illustrates an example process 1200 for evaluating one or more machine learning models using the generated benchmarking dataset 232, according to some embodiments of the current subject matter. The process 1200 may be executed by the server device 102 and/or any other computing device. The process 1200 may be configured to use one or more of the labels generated by the benchmarking dataset generation engine 150. In particular, the labels may be used to generate one or more template and/or ground truth labels for an electronic document and/or documents and compare such ground truth labels to labels generated by other machine learning models of the same and/or different electronic documents. The machine learning models may be any type of large language models, generative AI models, and/or any other types of models that may be capable of executing generation of labels for electronic documents and/or portions thereof based on one or more inputs provided to them. The labels may be in the form of key-value pairs, where keys may be associated with specific portions of the document (e.g., termination provision of a lease agreement, jurisdiction provision, etc.). Each key may have an associated value (e.g., "term is five years", "law of State of California", etc.). Comparison of key-value pairs may involve comparisons of keys and comparison of values, where comparisons may be executed in dependence on results of the other (e.g., key comparison is performed first and if a match is determined, a value comparison is performed, otherwise, no value comparison is performed) and/or independent of one another.

At 1202, the server device 102 may be configured to identify a machine learning (ML) model for training using the benchmarking dataset 232. As stated above, the identified ML model may be any type of large language model, generative AI model, and/or any other type of model. The identified model may be trained, at 1204, using the benchmarking dataset 232 that has been generated in accordance with the processes described herein. A trained ML model may be outputted as a result.

At 1206, one or more electronic documents may be retrieved (and/or received) from one or more sources 202, 204. The trained ML model may then be requested to generate one or more ground truth labels for such document(s). The labels may be represented as key-value pairs. The ground truth labels may be set as labels against which all other labels for electronic documents may be compared. Moreover, the ground truth labels may also be included in the benchmarking dataset 232. For example, one set of ground truth labels may be generated for a specific type of machine learning model, a type of document (e.g., a lease agreement, a sales agreement, etc.), a particular entity that may be involved with the agreement, and/or for any other reason. Thus, when analysis of a particular machine learning model may be required, a particular set of ground truth labels may be retrieved from a storage location and used for evaluation of effectiveness/accuracy of that model.

At 1208, evaluation of another machine learning model (e.g., a large language model, a generative AI model, etc.) may be executed. The machine learning model may be selected from a plurality of machine learning models. The model may be requested to generate one or more labels for the electronic document that may have been used to generate the set of ground truth labels. The requests transmitted to such other machine learning model may be the same as those provided to the trained machine learning model (e.g., requests 908, 912). This way the models (i.e., the trained model and the selected model) are not provided with different requests, thereby enabling a leveled comparison.

The labels generated by the selected model may be compared to the ground truth labels, at 1210. Comparison may be executed by comparing key portions of both sets of labels and value portions of both sets of labels. In some embodiments, comparison of keys may be performed first and if comparison indicates that keys match and/or match within a predetermined threshold, comparison of respective values may be performed. For example, the comparison may be made based on words, sentences, phrases, paragraphs, and/or any other portions that may form part of the labels. In some embodiments, the labels may be compared based on specific relevance and/or semantic meanings of the labels. One or more metrics may be used to execute such comparisons.

The metrics may be based on exact matching of labels (keys, values and/or both), soft matching of labels, etc. For example, for exact matching of labels, it may be important that selected models generate labels for electronic documents in the same way as the trained models that generated ground truth labels. In other instances, soft matching of labels may be acceptable, which may result in acceptance of labels that may lack certain words, sentences, phrases, etc., and/or any other elements that may be present in the set of ground truth labels. As can be understood, any metrics may be selected for evaluation of the labels generated by the selected ML model. Metrics may be selected based on specifics of the analysis of the selected ML model that may be requested and/or required.

If at 1212, it is determined that one or more of the above metrics associated with the set of ground truth labels and the generated labels match and/or satisfy one or more thresholds that may be associated with the metrics, the selected model may be deemed acceptable, at 1214, and thus, may be used for generation of labels for electronic documents. As can be understood, the acceptable model may be limited to generation of labels for specific type of documents (e.g., lease agreements) and/or may be used to generate labels for any type of documents.

Otherwise, if the metrics do not match and/or do not satisfy one or more thresholds associated with the metrics, the selected model may be deemed unacceptable, at 1216. Such selected models may be deemed unacceptable for generation of labels for specific type of documents (e.g., sales agreements) but may be deemed acceptable for generation of labels for other type of documents (e.g., lease agreements). As can be understood, acceptability or non-acceptability of any of selected models for label generation purposes may be determined in any other way.

Figure 13:
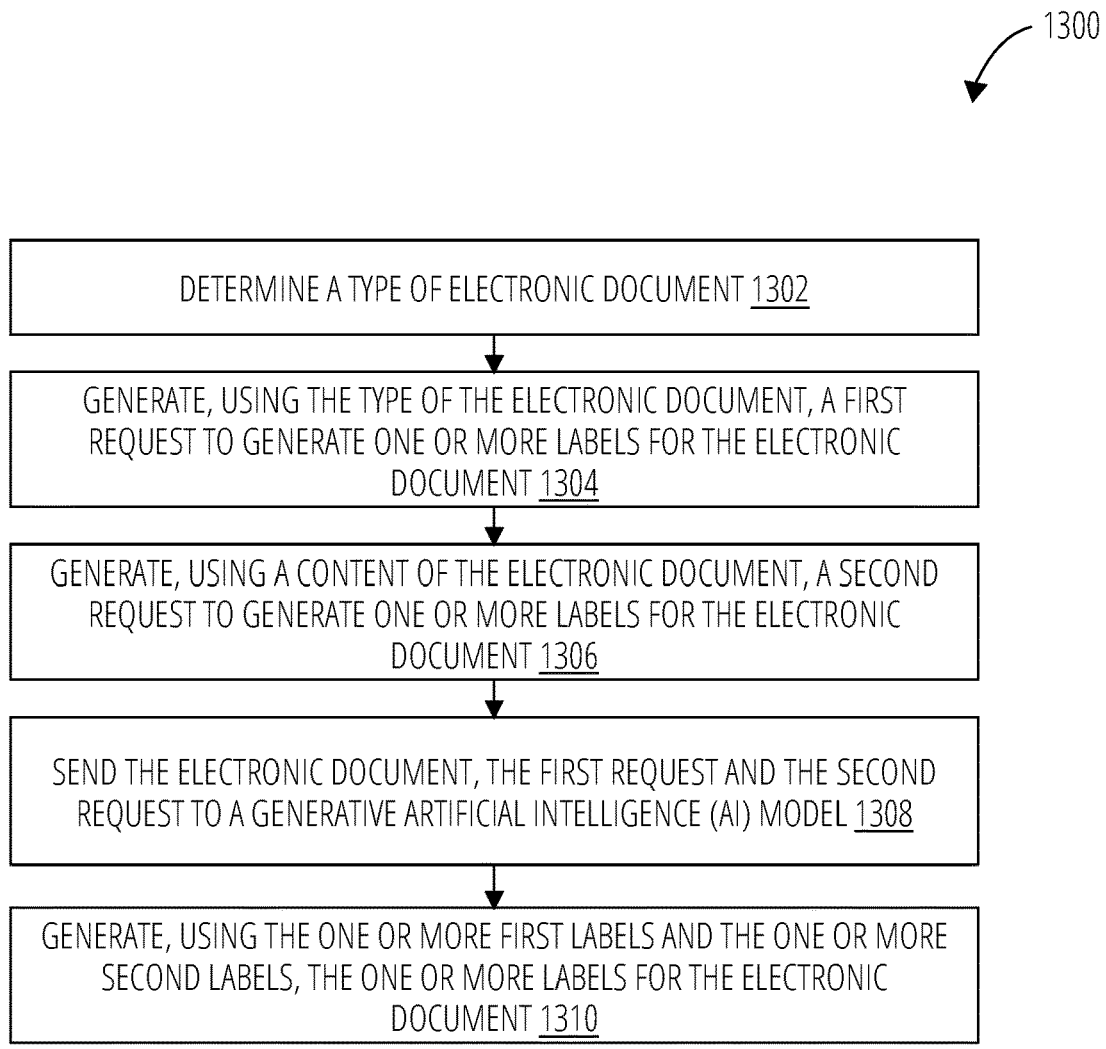
FIG. 13 illustrates an example process for generating a benchmarking dataset, according to some embodiments of the current subject matter.

FIG. 13 illustrates an example process 1300 for generating a benchmarking dataset (e.g., benchmarking dataset 232), according to some embodiments of the current subject matter. The process 1300 may be executed by the system 100 shown in FIG. 1, and in particular, the benchmarking dataset generation engine 150, as shown in FIG. 2.

At 1302, benchmarking dataset generation engine 150 may determine a type of an electronic document. The electronic document may be retrieved from one or more data sources 202, 204, as shown in FIG. 2.

At 1304, benchmarking dataset generation engine 150 may generate, using the type of the electronic document, a first request (e.g., request to generate document-type based labels 908) to generate one or more labels for the electronic document. The benchmarking dataset generation engine 150 may send the documents to the generative AI model(s) 218 along with an indication of type(s) of documents as part of its first request. As stated above, the generative AI model(s) 218 may be part of the current subject matter system and/or a third-party generative AI model.

At 1306, the engine 150 may generate, using a content of the electronic document, a second request to generate one or more labels for the electronic document. The benchmarking dataset generation engine 150 may be configured to execute an analysis of the content of the document and/or any portions thereof to determine specific contextual features that may be used to form the request that may be sent to generative AI model(s) 218.

At 1308, the benchmarking dataset generation engine 150 may send the electronic document as well as the first and second requests to the generative AI model(s) 218. The generative AI model(s) 218 may be configured to generate one or more first labels for the electronic document based on the first request. For example, the generative AI model(s) 218 may generate document-type based labels 910 based on request to generate document-type based labels 908, as shown in FIG. 9. The generative AI model(s) 218 may also generate one or more second labels for the electronic document based on the second request. For instance, the generative AI model(s) 218 may generate document content-based labels 914 based on the request to generate document content-based labels 912, as shown in FIG. 9.

At 1310, the engine 150 may generate one or more labels for the electronic document based on using one or more of the first and second labels. The combined labels may form a label sets 214 that may be used by label generation engine 216 to generate labels 220 that may then be reviewed by the feedback engine 222. As a result, any labels that may be accepted (e.g., accepted label(s) 228) may form benchmarking dataset 232. In some embodiments rejected labels (e.g., rejected label(s) 230) may also form benchmarking dataset 232 as labels that should not be acceptable when evaluating a machine learning model.

Figure 14:
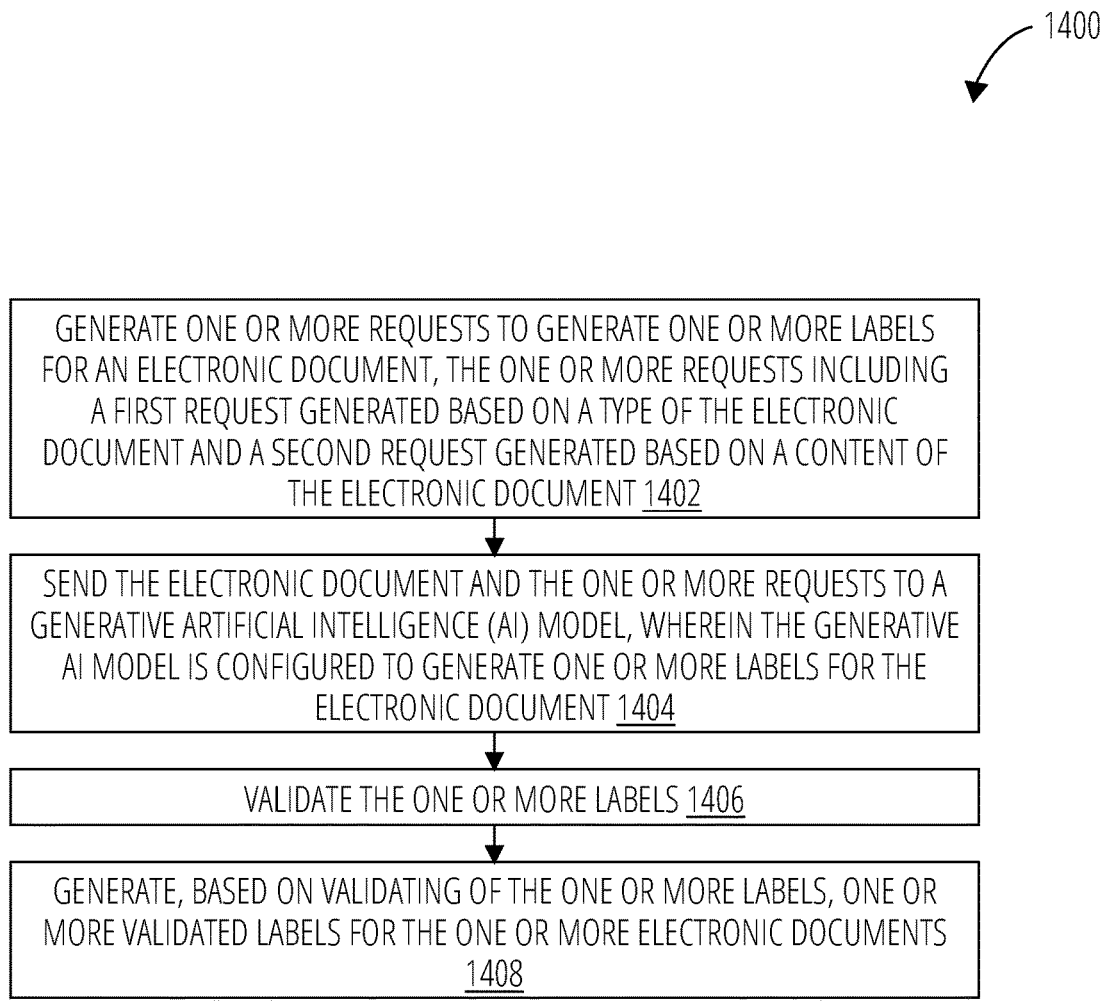
FIG. 14 illustrates another example process for generating a benchmarking dataset, according to some embodiments of the current subject matter.

FIG. 14 illustrates another example process 1400 for generating a benchmarking dataset, according to some embodiments of the current subject matter. The process 1400 may also be executed by the benchmarking dataset generation engine 150 shown in FIG. 2.

At 1402, benchmarking dataset generation engine 150 may generate one or more requests (e.g., requests 908, 912, as shown in FIG. 9) to generate one or more labels (e.g., labels 910, 914) for an electronic document (e.g., documents retrieved from sources 202, 204). The requests may include a first request (e.g., request 908) that may be generated based on a type of the electronic document that may be received by benchmarking dataset generation engine 150. The requests may also include a second request (e.g., request 912) that may be generated by benchmarking dataset generation engine 150 based on an analysis of content of the electronic document.

At 1404, engine 150 may send the electronic document and the request(s) to a generative artificial intelligence (AI) model (e.g., generative AI model(s) 218). The generative AI model may be configured to generate one or more labels (e.g., label sets 214) for the electronic document. The engine 150 may then use the label sets 214 to generate one or more labels label(s) 220.

At 1406, the benchmarking dataset generation engine 150 may validate the label(s) 220, and, at 1408, may generate one or more validated labels for the electronic documents based on validation.

Figure 15:
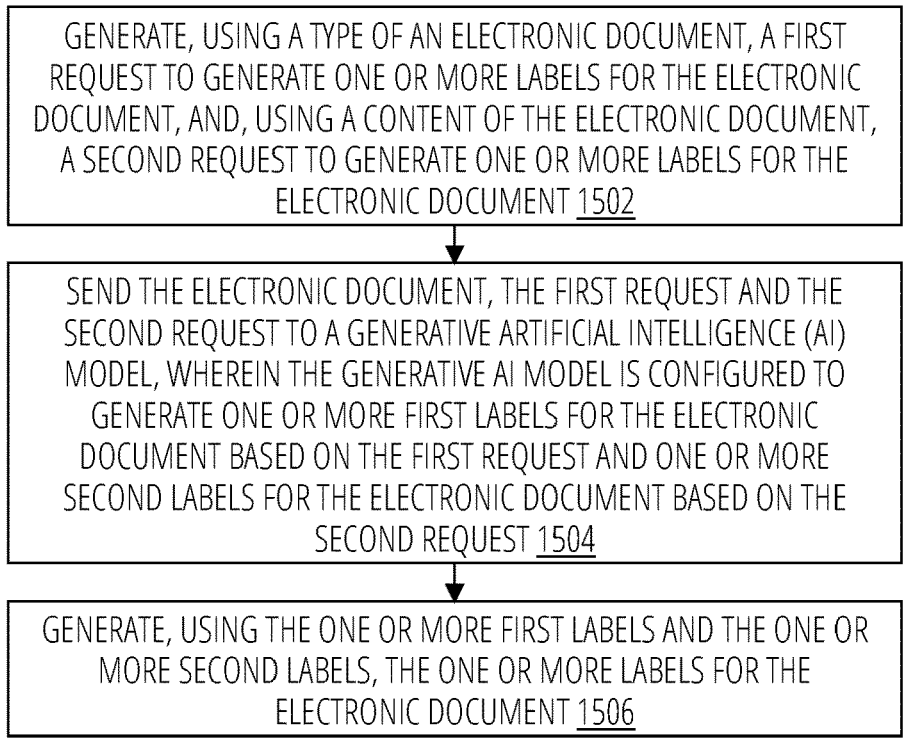
FIG. 15 illustrates yet another example process for generating a benchmarking dataset, according to some embodiments of the current subject matter.

FIG. 15 illustrates yet another example process 1500 for generating a benchmarking dataset, according to some embodiments of the current subject matter. The process 1500 may likewise be executed by the engine 150 as shown in FIG. 2.

At 1502, the benchmarking dataset generation engine 150 may generate, using a type of an electronic document (as retrieved from sources 202, 204), a first request (e.g., request 908) to generate labels for the electronic document, and, using a content of the electronic document, a second request (e.g., request 912) to generate one or more labels for the electronic document.

At 1504, the engine 150 may send the electronic document, the first and second requests to a generative artificial intelligence (AI) model (e.g., generative AI model(s) 218). The generative AI model(s) 218 may be configured to generate one or more first labels (e.g., labels 910) for the electronic document based on the first request and one or more second labels (e.g., labels 914) for the electronic document based on the second request.

At 1506, the benchmarking dataset generation engine 150 may generate labels for the electronic document using one or more first and/or second labels.

Figure 16:
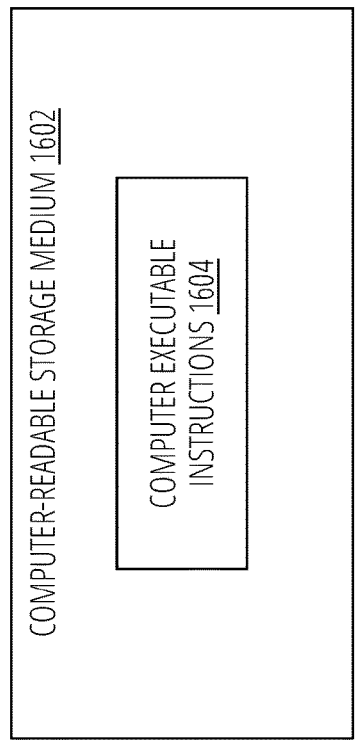
FIG. 16 illustrates a computer-readable storage medium in accordance with one embodiment.

FIG. 16 illustrates an apparatus 1600. Apparatus 1600 may comprise any non-transitory computer-readable storage medium 1602 or machine-readable storage medium, such as an optical, magnetic or semiconductor storage medium. In various embodiments, apparatus 1600 may comprise an article of manufacture or a product. In some embodiments, the computer-readable storage medium 1602 may store computer executable instructions with which circuitry can execute. For example, computer executable instructions 1604 can include instructions to implement operations described with respect to any logic flows described herein. Examples of computer-readable storage medium 1602 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1604 may include any suitable type of code, such as source code, compiled code, interpreted code, executable code, static code, dynamic code, object-oriented code, visual code, and the like.

FIG. 17 illustrates an embodiment of a computing architecture 1700. Computing architecture 1700 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1700 may have a single processor with one core or more than one processor. Note that the term "processor" refers to a processor with a single core or a processor package with multiple processor cores. In at least one embodiment, the computing architecture 1700 is representative of the components of the system 100. More generally, the computing architecture 1700 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 17, computing architecture 1700 comprises a system-on-chip (SoC) 1702 for mounting platform components. System-on-chip (SoC) 1702 is a point-to-point (P2P) interconnect platform that includes a first processor 1704 and a second processor 1706 coupled via a point-to-point interconnect 1770 such as an Ultra Path Interconnect (UPI). In other embodiments, the computing architecture 1700 may be of another bus architecture, such as a multi-drop bus. Furthermore, each of processor 1704 and processor 1706 may be processor packages with multiple processor cores including core(s) 1708 and core(s) 1710, respectively. While the computing architecture 1700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1704 and chipset 1732. Some platforms may include additional components and some platforms may only include sockets to mount the processors and/or the chipset. Furthermore, some platforms may not have sockets (e.g., SoC, or the like). Although depicted as a SoC 1702, one or more of the components of the SoC 1702 may also be included in a single die package, a multi-chip module (MCM), a multi-die package, a chiplet, a bridge, and/or an interposer. Therefore, embodiments are not limited to a SoC.

The processor 1704 and processor 1706 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1704 and/or processor 1706. Additionally, the processor 1704 need not be identical to processor 1706.

Processor 1704 includes an integrated memory controller (IMC) 1720 and point-to-point (P2P) interface 1724 and P2P interface 1728. Similarly, the processor 1706 includes an IMC 1722 as well as P2P interface 1726 and P2P interface 1730. IMC 1720 and IMC 1722 couple the processor 1704 and processor 1706, respectively, to respective memories (e.g., memory 1716 and memory 1718). Memory 1716 and memory 1718 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1716 and the memory 1718 locally attach to the respective processors (i.e., processor 1704 and processor 1706). In other embodiments, the main memory may couple with the processors via a bus and shared memory hub. Processor 1704 includes registers 1712 and processor 1706 includes registers 1714.

Computing architecture 1700 includes chipset 1732 coupled to processor 1704 and processor 1706. Furthermore, chipset 1732 can be coupled to storage device 1750, for example, via an interface (I/F) 1738. The I/F 1738 may be, for example, a Peripheral Component Interconnect-enhanced (PCIe) interface, a Compute Express Link® (CXL) interface, or a Universal Chiplet Interconnect Express (UCIe) interface. Storage device 1750 can store instructions executable by circuitry of computing architecture 1700 (e.g., processor 1704, processor 1706, GPU 1748, accelerator 1754, vision processing unit 1756, or the like). For example, storage device 1750 can store instructions for server device 102, client devices 112, client devices 116, or the like.

Processor 1704 couples to the chipset 1732 via P2P interface 1728 and P2P 1734 while processor 1706 couples to the chipset 1732 via P2P interface 1730 and P2P 1736. Direct media interface (DMI) 1776 and DMI 1778 may couple the P2P interface 1728 and the P2P 1734 and the P2P interface 1730 and P2P 1736, respectively. DMI 1776 and DMI 1778 may be a high-speed interconnect that facilitates, e.g., eight Giga Transfers per second (GT/s) such as DMI 3.0. In other embodiments, the processor 1704 and processor 1706 may interconnect via a bus.

The chipset 1732 may comprise a controller hub such as a platform controller hub (PCH). The chipset 1732 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1732 may comprise more than one controller hub such as a chipset with a memory controller hub, a graphics controller hub, and an input/output (I/O) controller hub.

In the depicted example, chipset 1732 couples with a trusted platform module (TPM) 1744 and UEFI, BIOS, FLASH circuitry 1746 via I/F 1742. The TPM 1744 is a dedicated microcontroller designed to secure hardware by integrating cryptographic keys into devices. The UEFI, BIOS, FLASH circuitry 1746 may provide pre-boot code. The I/F 1742 may also be coupled to a network interface circuit (NIC) 1780 for connections off-chip.

Furthermore, chipset 1732 includes the I/F 1738 to couple chipset 1732 with a high-performance graphics engine, such as, graphics processing circuitry or a graphics processing unit (GPU) 1748. In other embodiments, the computing architecture 1700 may include a flexible display interface (FDI) (not shown) between the processor 1704 and/or the processor 1706 and the chipset 1732. The FDI interconnects a graphics processor core in one or more of processor 1704 and/or processor 1706 with the chipset 1732.

The computing architecture 1700 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1754 and/or vision processing unit 1756 can be coupled to chipset 1732 via I/F 1738. The accelerator 1754 is representative of any type of accelerator device (e.g., a data streaming accelerator, cryptographic accelerator, cryptographic co-processor, an offload engine, etc.). One example of an accelerator 1754 is the Intel® Data Streaming Accelerator (DSA). The accelerator 1754 may be a device including circuitry to accelerate copy operations, data encryption, hash value computation, data comparison operations (including comparison of data in memory 1716 and/or memory 1718), and/or data compression. For example, the accelerator 1754 may be a USB device, PCI device, PCIe device, CXL device, UCIe device, and/or an SPI device. The accelerator 1754 can also include circuitry arranged to execute machine learning (ML) related operations (e.g., training, inference, etc.) for ML models. Generally, the accelerator 1754 may be specially designed to perform computationally intensive operations, such as hash value computations, comparison operations, cryptographic operations, and/or compression operations, in a manner that is more efficient than when performed by the processor 1704 or processor 1706. Because the load of the computing architecture 1700 may include hash value computations, comparison operations, cryptographic operations, and/or compression operations, the accelerator 1754 can greatly increase performance of the computing architecture 1700 for these operations.

The accelerator 1754 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1754. For example, the accelerator 1754 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1754 via a non-posted write (e.g., a deferred memory write (DMWr)). One example of an instruction that atomically submits a work descriptor to the shared work queue of the accelerator 1754 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator

1754. The dedicated work queue may accept job submissions via commands such as the movdir64b instruction.

Various I/O devices 1760 and display 1752 couple to the bus 1772, along with a bus bridge 1758 which couples the bus 1772 to a second bus 1774 and an I/F 1740 that connects the bus 1772 with the chipset 1732. In one embodiment, the second bus 1774 may be a low pin count (LPC) bus. Various devices may couple to the second bus 1774 including, for example, a keyboard 1762, a mouse 1764 and communication devices 1766.

Furthermore, an audio I/O 1768 may couple to second bus 1774. Many of the I/O devices 1760 and communication devices 1766 may reside on the system-on-chip (SoC) 1702 while the keyboard 1762 and the mouse 1764 may be add-on peripherals. In other embodiments, some or all the I/O devices 1760 and communication devices 1766 are add-on peripherals and do not reside on the system-on-chip (SoC) 1702.

FIG. 18 illustrates a block diagram of an exemplary communications architecture 1800 suitable for implementing various embodiments as previously described. The communications architecture 1800 includes various common communications elements, such as a transmitter, receiver, transceiver, radio, network interface, baseband processor, antenna, amplifiers, filters, power supplies, and so forth. The embodiments, however, are not limited to implementation by the communications architecture 1800.

As shown in FIG. 18, the communications architecture 1800 includes one or more clients 1802 and servers 1804. The clients 1802 may implement a client version of the server device 102, for example. The servers 1804 may implement a server version of the server device 102, for example. The clients 1802 and the servers 1804 are operatively connected to one or more respective client data stores 1808 and server data stores 1810 that can be employed to store information local to the respective clients 1802 and servers 1804, such as cookies and/or associated contextual information.

The clients 1802 and the servers 1804 may communicate information between each other using a communication framework 1806. The communications communication framework 1806 may implement any well-known communications techniques and protocols. The communications communication framework 1806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1802 and the servers 1804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential embodiments. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-19 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential embodiments. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a method, includes determining, using at least one processor, a type of an electronic document; generating, using the at least one processor, using the type of the electronic document, a first request to generate one or more labels for the electronic document; generating, using the at least one processor, using a content of the electronic document, a second request to generate one or more labels for the electronic document; sending, using the at least one processor, the electronic document, the first request and the second request to a generative artificial intelligence (AI) model, wherein the generative AI model is configured to generate one or more first labels for the electronic document based on the first request and one or more second labels for the electronic document based on the second request; and generating, using the at least one processor, using the one or more first labels and the one or more second labels, the one or more labels for the electronic document.

The method may also include wherein the one or more first labels are generated irrespective of the content of the electronic document.

The method may also include wherein one or more first labels are generated using at least one of the following: an entirety of the electronic document, one or more pages of the electronic document, one or more sentences of the electronic document, one or more phrases of the electronic document, one or more words of the electronic document, one or more portions of the electronic document, and any combinations thereof.

The method may also include wherein the type of the electronic document includes at least one of the following: an agreement type, a legal document type, a non-legal document type, and any combinations thereof.

The method may also include further comprising validating the one or more labels; and generating, based on the validating, one or more validated labels for the electronic document.

The method may also include the validating including analyzing a subject matter of the one or more validated labels.

The method may also include further comprising generating one or more rules to analyze the one or more validated labels; analyzing, using the one or more rules, the one or more validated labels; determining at least one validated label in the one or more validated labels complying with the one or more rules, and accepting the at least one validated label for the electronic document; and determining at least another validated label in the one or more validated labels failing to comply with the one or more rules and preventing use of the at least another validated label for labeling the electronic document.

The method may also include further comprising identifying a machine learning model in a plurality of machine learning models; training the machine learning model using the one or more labels; outputting a trained machine learning model; and generating, using the trained machine learning model, one or more ground truth keys representative of the electronic document, each ground truth key in the one or more ground truth keys is associated with a ground truth value corresponding to a portion of the electronic document.

The method may also include further comprising identifying a first machine learning model in the plurality of machine learning models; generating, using the first machine learning model, one or more first keys for the electronic document, each first key in the one or more first keys is associated with a first value; comparing at least one of: the one or more first keys to the one or more ground truth keys, the first value to the ground truth value, and any combination thereof; determining, based on the comparing, whether the first machine learning model is acceptable for generating one or more labels for at least another electronic document.

The method may also include wherein the plurality of machine learning model includes at least one of the following: a large language model, at least another generative AI model, and any combination thereof.

In one aspect, a system may include at least one processor and at least one non-transitory storage media storing instructions, that when executed by the at least one processor, cause the at least one processor to generate one or more requests to generate one or more labels for an electronic document, the one or more requests including a first request generated based on a type of the electronic document and a second request generated based on a content of the electronic document; send the electronic document and the one or more requests to a generative artificial intelligence (AI) model, wherein the generative AI model is configured to generate one or more labels for the electronic document; validate the one or more labels; and generate, based on validating of the one or more labels, one or more validated labels for the one or more electronic documents.

The system may also include wherein the one or more labels include one or more first labels for the electronic document generated based on the first request and one or more second labels for the electronic document generated based on the second request.

The system may also include wherein the one or more first labels are generated irrespective of the content of the electronic document.

The system may also include wherein one or more first labels are generated using at least one of the following: an entirety of the electronic document, one or more pages of the electronic document, one or more sentences of the electronic document, one or more phrases of the electronic document, one or more words of the electronic document, one or more portions of the electronic document, and any combinations thereof.

The system may also include wherein the type of the electronic document includes at least one of the following: an agreement type, a legal document type, a non-legal document type, and any combinations thereof.

The system may also include wherein validation of the one or more labels includes analyzing a subject matter of the one or more validated labels.

The system may also include wherein the at least one processor is configured to generate one or more rules to analyze the one or more validated labels; analyze, using the one or more rules, the one or more validated labels; determine at least one validated label in the one or more validated labels complying with the one or more rules, and accept the at least one validated label for the one or more electronic documents; and determine at least another validated label in the one or more validated labels failing to comply with the one or more rules and prevent use of the at least another validated label for labeling the one or more electronic documents.

In one aspect, a computer program product comprising a non-transitory machine-readable medium storing instructions that, when executed by at least one programmable processor, cause the at least one programmable processor to: generate, using a type of an electronic document, a first request to generate one or more labels for the electronic document, and, using a content of the electronic document, a second request to generate one or more labels for the electronic document; send the electronic document, the first request and the second request to a generative artificial intelligence (AI) model, wherein the generative AI model is configured to generate one or more first labels for the electronic document based on the first request and one or more second labels for the electronic document based on the second request; and generate, using the one or more first labels and the one or more second labels, the one or more labels for the electronic document.

The computer program product may also include wherein the one or more labels include one or more first labels for the electronic document generated based on the first request and one or more second labels for the electronic document generated based on the second request.

The computer program product may also include wherein the one or more first labels are generated irrespective of the content of the electronic document.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:
  determining, using at least one processor, a type of an electronic document;
  generating, using the at least one processor, using the type of the electronic document, a first request to generate one or more labels for the electronic document;
  generating, using the at least one processor, using a content of the electronic document, a second request to generate one or more labels for the electronic document;
  sending, using the at least one processor, the electronic document, the first request and the second request to a generative artificial intelligence (AI) model, wherein the generative AI model is configured to generate one or more first labels for the electronic document based on the first request and one or more second labels for the electronic document based on the second request, the one or more first labels are generated based on the type of the electronic document and irrespective of the content of the electronic document and the one or more second labels are generated based on the content of the electronic document; and
  generating, using the at least one processor, using the one or more first labels and the one or more second labels, the one or more labels for the electronic document.

2. The method of claim 1, wherein one or more first labels are generated using at least one of the following: an entirety of the electronic document, one or more pages of the electronic document, one or more sentences of the electronic document, one or more phrases of the electronic document, one or more words of the electronic document, one or more portions of the electronic document, and any combinations thereof.

3. The method of claim 1, wherein the type of the electronic document includes at least one of the following: an agreement type, a legal document type, a non-legal document type, and any combinations thereof.

4. The method of claim 1, further comprising
  validating the one or more labels; and
  generating, based on the validating, one or more validated labels for the electronic document.

5. The method of claim 4, wherein the validating including analyzing a subject matter of the one or more validated labels.

6. The method of claim 4, further comprising
  generating one or more rules to analyze the one or more validated labels;
  analyzing, using the one or more rules, the one or more validated labels;
  determining at least one validated label in the one or more validated labels complying with the one or more rules, and accepting the at least one validated label for the electronic document; and
  determining at least another validated label in the one or more validated labels failing to comply with the one or more rules and preventing use of the at least another validated label for labeling the electronic document.

7. The method of claim 1, further comprising
  identifying a machine learning model in a plurality of machine learning models;
  training the machine learning model using the one or more labels;
  outputting a trained machine learning model; and
  generating, using the trained machine learning model, one or more ground truth keys representative of the electronic document, each ground truth key in the one or more ground truth keys is associated with a ground truth value corresponding to a portion of the electronic document.

8. The method of claim 7, further comprising
  identifying a first machine learning model in the plurality of machine learning models;
  generating, using the first machine learning model, one or more first keys for the electronic document, each first key in the one or more first keys is associated with a first value;
  comparing at least one of: the one or more first keys to the one or more ground truth keys, the first value to the ground truth value, and any combination thereof;
  determining, based on the comparing, whether the first machine learning model is acceptable for generating one or more labels for at least another electronic document.

9. The method of claim 7, wherein the plurality of machine learning model includes at least one of the following: a large language model, at least another generative AI model, and any combination thereof.

10. A system, comprising:
  at least one processor; and
  at least one non-transitory storage media storing instructions, that when executed by the at least one processor, cause the at least one processor to generate one or more requests to generate one or more labels for an electronic document, the one or more requests including a first request generated based on a type of the electronic document and a second request generated based on a content of the electronic document, the one or more labels include one or more first labels for the electronic document generated based on the first request and one or more second labels for the electronic document generated based on the second request, the one or more first labels are generated based on the type of the electronic document and irrespective of the content of the electronic document and the one or more second labels are generated based on the content of the electronic document;

send the electronic document and the one or more requests to a generative artificial intelligence (AI) model, wherein the generative AI model is configured to generate one or more labels for the electronic document;

validate the one or more labels; and generate, based on validating of the one or more labels, one or more validated labels for the one or more electronic documents.

11. The system of claim 10, wherein one or more first labels are generated using at least one of the following: an entirety of the electronic document, one or more pages of the electronic document, one or more sentences of the electronic document, one or more phrases of the electronic document, one or more words of the electronic document, one or more portions of the electronic document, and any combinations thereof.

12. The system of claim 10, wherein the type of the electronic document includes at least one of the following: an agreement type, a legal document type, a non-legal document type, and any combinations thereof.

13. The system of claim 10, wherein validation of the one or more labels includes analyzing a subject matter of the one or more validated labels.

14. The system of claim 10, wherein the at least one processor is configured to generate one or more rules to analyze the one or more validated labels;

analyze, using the one or more rules, the one or more validated labels;

determine at least one validated label in the one or more validated labels complying with the one or more rules, and accept the at least one validated label for the one or more electronic documents; and determine at least another validated label in the one or more validated labels failing to comply with the one or more rules and prevent use of the at least another validated label for labeling the one or more electronic documents.

15. A computer program product comprising a non-transitory machine-readable medium storing instructions that, when executed by at least one programmable processor, cause the at least one programmable processor to:

generate, using a type of an electronic document, a first request to generate one or more labels for the electronic document, and, using a content of the electronic document, a second request to generate one or more labels for the electronic document;

send the electronic document, the first request and the second request to a generative artificial intelligence (AI) model, wherein the generative AI model is configured to generate one or more first labels for the electronic document based on the first request and one or more second labels for the electronic document based on the second request, the one or more first labels are generated based on the type of the electronic document and irrespective of the content of the electronic document and the one or more second labels are generated based on the content of the electronic document; and generate, using the one or more first labels and the one or more second labels, the one or more labels for the electronic document.

* * * * *